(12) United States Patent
Tanaka et al.

(10) Patent No.: US 8,675,697 B2
(45) Date of Patent: Mar. 18, 2014

(54) MASTER OSCILLATOR SYSTEM AND LASER APPARATUS

(75) Inventors: Satoshi Tanaka, Tochigi (JP); Hiroshi Tanaka, Tochigi (JP); Osamu Wakabayashi, Kanagawa (JP)

(73) Assignee: Gigaphoton Inc., Tochigi (JP)

( * ) Notice: Subject to any disclaimer, the term of this patent is extended or adjusted under 35 U.S.C. 154(b) by 27 days.

(21) Appl. No.: 13/597,556

(22) Filed: Aug. 29, 2012

(65) Prior Publication Data

US 2013/0230064 A1   Sep. 5, 2013

(30) Foreign Application Priority Data

Sep. 8, 2011 (JP) ................................. 2011-196264
Feb. 3, 2012 (JP) ................................. 2012-022444
Jul. 4, 2012 (JP) ................................. 2012-150852

(51) Int. Cl.
*H01S 3/10* (2006.01)

(52) U.S. Cl.
USPC ............ 372/20; 372/25; 372/29.022; 372/30; 372/99; 372/102

(58) Field of Classification Search
USPC ............................. 372/20, 25, 29.022, 30, 99
See application file for complete search history.

(56) References Cited

U.S. PATENT DOCUMENTS

| | | | |
|---|---|---|---|
| 6,393,037 B1 | 5/2002 | Basting et al. | |
| 6,426,966 B1 | 7/2002 | Basting et al. | |
| 6,856,638 B2 | 2/2005 | Aab et al. | |
| 6,859,305 B2 | 2/2005 | Chen et al. | |
| 7,088,758 B2 | 8/2006 | Sandstrom et al. | |
| 7,154,928 B2 | 12/2006 | Sandstrom et al. | |
| 7,756,183 B2 | 7/2010 | Wakabayashi et al. | |
| 7,929,203 B2 * | 4/2011 | Harter et al. | 359/348 |
| 2006/0114958 A1 | 6/2006 | Trintchouk et al. | |
| 2009/0225793 A1 * | 9/2009 | Marciante et al. | 372/6 |
| 2010/0309945 A1 * | 12/2010 | Govorkov et al. | 372/57 |

FOREIGN PATENT DOCUMENTS

| | | |
|---|---|---|
| JP | 11-274632 | 10/1999 |
| JP | 2001-196679 | 7/2001 |
| JP | 2002-094160 | 3/2002 |
| JP | 2004-526313 | 8/2004 |
| JP | 2007-012805 | 1/2007 |
| JP | 2008-098282 | 4/2008 |
| WO | WO 02/069461 | 9/2002 |

* cited by examiner

*Primary Examiner* — Dung Nguyen
(74) *Attorney, Agent, or Firm* — IPUSA, PLLC

(57) ABSTRACT

A master oscillator system may include a grating configured to function as one resonator mirror in an optical resonator, a spectral bandwidth tuning unit configured to tune the spectral bandwidth of a laser beam transmitted within the optical resonator, a storage unit configured to store a control value of the spectral bandwidth tuning unit corresponding to a desired spectral bandwidth and a controller configured to control the spectral bandwidth tuning unit based on the control value stored in the storage unit.

14 Claims, 34 Drawing Sheets

CONTROL VALUE W (WAVEFRONT)

CONTROL VALUE M
(BEAM WIDTH (MAGNIFICATION RATE))

MASTER OSCILLATOR SYSTEM AND LASER APPARATUS

CROSS-REFERENCE TO RELATED APPLICATIONS

The present application claims priority from Japanese Patent Application No. 2011-196264 filed Sep. 8, 2011, and Japanese Patent Application No. 2012-022444 filed Feb. 3, 2012, and Japanese Patent Application No. 2012-150852 filed Jul. 4, 2012.

BACKGROUND

1. Technical Field

The present disclosure relates to master oscillator systems and laser apparatuses.

2. Related Art

The miniaturization and increased levels of integration of semiconductor integrated circuits have led to a demand for increases in the resolutions of semiconductor exposure devices (called "exposure devices" hereinafter). Accordingly, advances are being made in the reduction of the wavelengths of light emitted from exposure light sources. Gas laser apparatuses are being used as exposure light sources instead of conventional mercury lamps. At present, a KrF excimer laser apparatus that emits ultraviolet light at a wavelength of 248 nm and an ArF excimer laser apparatus that emits ultraviolet light at a wavelength of 193 nm are being used as gas laser apparatuses for exposure.

Immersion exposure, in which the apparent wavelength of an exposure light source is reduced by filling the space between the exposure lens of an exposure device and a wafer with a liquid and changing the refractive index, is being researched as a next-generation exposure technique. In the case where immersion exposure is carried out using an ArF excimer laser apparatus as the exposure light source, the wafer is irradiated with ultraviolet light at a wavelength of 134 nm within the liquid. This technique is referred to as ArF immersion exposure (or ArF immersion lithography).

The natural oscillation amplitude of a KrF excimer laser apparatus, an ArF excimer laser apparatus, or the like is as wide as 350-400 pm. Accordingly, there are cases where chromatic aberration will occur if a projection lens is used in the exposure device, leading to a drop in the resolution. Accordingly, it is necessary to narrow the spectral bandwidth (spectral width) of the laser beam emitted from the gas laser apparatus until the chromatic aberration reaches a level that can be ignored. In recent years, the spectral width has been narrowed by providing a line narrow module having a line narrowing element (an etalon, a grating, or the like) within the laser resonator of the gas laser apparatus. A laser apparatus that narrows the spectral width in this manner is called a narrow-band laser apparatus.

SUMMARY

A master oscillator system according to an aspect of the present disclosure may include: a grating configured to function as one resonator mirror in an optical resonator; a spectral bandwidth tuning unit configured to tune the spectral bandwidth of laser beam transmitted within the optical resonator; a storage unit configured to store a control value of the spectral bandwidth tuning unit corresponding to a desired spectral bandwidth; and a controller configured to control the spectral bandwidth tuning unit based on the control value stored in the storage unit.

A laser apparatus according to another aspect of the present disclosure may include the aforementioned master oscillator system and a detection unit configured to detect a spectral bandwidth of a laser beam outputted from the master oscillator system. The controller may control the spectral bandwidth tuning unit based on the spectral bandwidth detected by the detection unit.

BRIEF DESCRIPTION OF THE DRAWINGS

Exemplary embodiments of the present disclosure will be described hereinafter with reference to the appended drawings.

DETAILED DESCRIPTION

Figure 1:
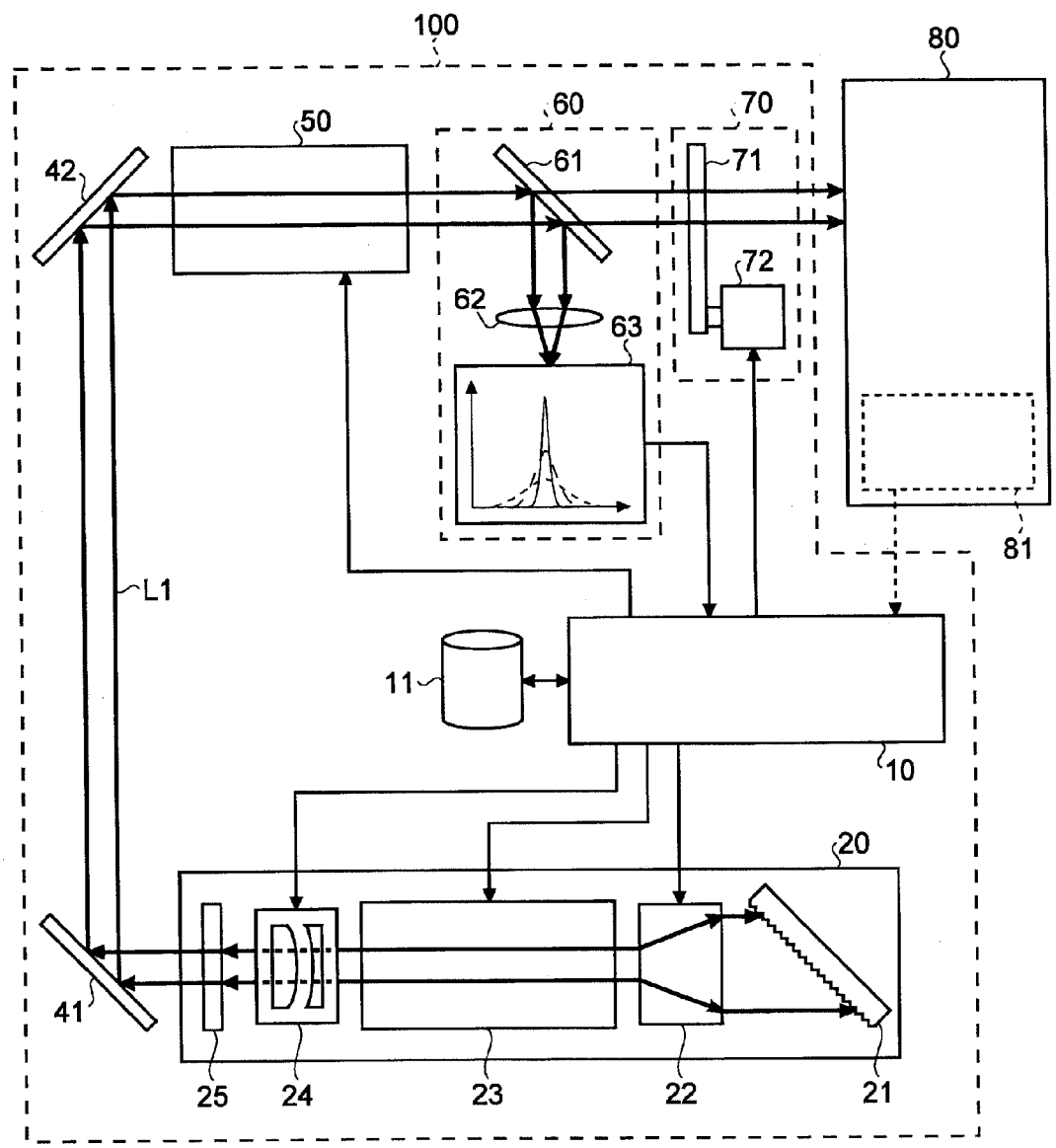
FIG. 1 schematically illustrates an example of the configuration of a laser apparatus according to an embodiment.

Embodiments of the present disclosure will be described in detail hereinafter with reference to the drawings. The embodiments described hereinafter indicate examples of the present disclosure, and are not intended to limit the content of the present disclosure. Furthermore, not all of the configurations and operations described in the embodiments are required configurations and operations in the present disclosure. Note that identical constituent elements will be given identical reference numerals, and redundant descriptions thereof will be omitted. The following descriptions will be given according to the order of contents indicated below.

Contents
1. Outline
2. Explanation of Terms
3. Variable Spectral Bandwidth Laser Apparatus for Exposure Device
   3.1 Configuration
   3.2 Operations
   3.3 Effects
   3.4 Relationship between Spectral Bandwidth and Control Value
   3.5 Example of Oscillation Stage (Master Oscillator)
      3.5.1 Beam Width Tuning Unit Using Cylindrical Lens
      3.5.2 Beam Width Tuning Unit Using Prism
   3.6 First Variation on Oscillation Stage (Master Oscillator)
      3.6.1 Beam Width Tuning Unit (Reduction System) Using Prism
      3.6.2 Beam Width Tuning Unit (Expanding System) Using Prism
      3.6.3 Beam Width Tuning Unit Using Cylindrical Mirror
   3.7 Second Variation on Oscillation Stage (Master Oscillator)
      3.7.1 Beam Width Tuning Unit Using Optical Path Tuning Prism
      3.7.2 Beam Width Tuning Unit Using Plurality of Optical Path Tuning Prisms (First Example)
      3.7.3 Beam Width Tuning Unit Using Plurality of Optical Path Tuning Prisms (Second Example)
      3.7.4 Beam Width Tuning Unit Using Plurality of Optical Path Tuning Prisms (Third Example)
      3.7.5 Beam Width Tuning Unit Using Plurality of Optical Path Tuning Prisms (Fourth Example)
   3.8 Third Variation on Oscillation Stage (Master Oscillator)
   3.9 Exemplary Configuration of Wavefront Tuning Unit
      3.9.1 First Example
      3.9.2 Second Example (when Doubling as Output Coupling Mirror)
   3.10 Example of Disposition of Wavefront Tuning Unit
      3.10.1 First Example (when Disposed within Resonator (Number 1))
      3.10.2 Second Example (when Disposed within Resonator (Number 2))

3.10.3 Third Example (when Doubling as Resonator Mirror (Number 1))
3.10.4 Fourth Example (when Doubling as Resonator Mirror (Number 2))
3.11 Oscillation Stage (Master Oscillator) in which Wavefront Tuning Unit can be Switched
   3.11.1 When Output Coupling Mirror and Wave front Tuning Unit are Separate Entities
   3.11.2 When Wavefront Tuning Unit Doubles as Output Coupling Mirror
3.12 Flowcharts
   3.12.1 First Example
      3.12.1.1 Laser Output Control Operation (Main Flow)
      3.12.1.2 Control Value Obtainment Subroutine
         3.12.1.2.1 First Example
         3.12.1.2.2 Second Example
      3.12.1.3 Spectral Bandwidth Tuning Subroutine
      3.12.1.4 One-Shot Control Subroutine
   3.12.2 Second Example
      3.12.2.1 Laser Output Control Operation (Main Flow)
      3.12.2.2 Change Amount Obtainment Subroutine
      3.12.2.3 Change Amount Calculation Example
4. Amplifying Apparatus
   4.1 Power Amplifier Using Excimer Gas as Gain Medium
   4.2 Power Oscillator Using Excimer Gas as Gain Medium
      4.2.1 Embodiment Including Fabry-Perot Resonator
      4.2.2 Embodiment Including Ring Resonator
5. Spectral Detector
   5.1 Monitor Etalon Spectroscope
   5.2 Grating-Type Spectroscope
6. Other
   6.1 Definition of Spectral Bandwidth E95

1. Outline

The embodiments described as examples hereinafter may include a tuning mechanism that tunes the spectral bandwidth of a laser beam. The tuning mechanism may be controlled using control values stored in a storage unit or the like.

2. Explanation of Terms

Next, terms used in the present disclosure will be defined.

In the optical path of a laser beam, the side toward the source of the laser beam will be referred to as "upstream," whereas the side toward the target destination of the laser beam will be referred to as "downstream."

In addition, an "optical axis" may be an axis that follows the direction of travel of the laser beam and passes through approximately the center of a cross-section of the laser beam.

"Beam expansion" refers to the cross-section of a beam gradually widening.

A "reduced beam" may be a laser beam whose laser cross-section is gradually reduced as the laser beam travels. An "expanded beam" may be a laser beam whose laser cross-section is gradually expanded as the laser beam travels.

A "predetermined repetition rate" may be any rate that has an approximately predetermined repetition rate, and need not necessarily be a constant repetition rate.

An excimer gas may be a mixed gas that serves as an excimer laser medium during pumping, and may include at least one of, for example, Kr gas, Ar gas, F2 gas, Ne gas, and Xe gas.

"Prism" refers to an element, having a triangular column shape or a shape similar thereto, through which light including a laser beam can pass. It is assumed that the base surface and the top surface of the prism are triangular or a shape similar thereto. The three surfaces of the prism that intersect with the base surface and the top surface at approximately 90° are referred to as side surfaces. In the case of a rectangular prism, the surface that does not intersect with the other two of the side surfaces at 90° is referred to as a sloped surface. Note that a prism whose shape has been changed by shaving the apex of the prism or the like can also be included as a prism in the present descriptions.

In the present disclosure, the direction in which a laser beam travels is defined as a Z direction. Likewise, a direction that is perpendicular to the Z direction is defined as an X direction, and a direction that is perpendicular to both the X direction and the Z direction is defined as a Y direction. Although the direction in which a laser beam travels is the Z direction, there are cases, in the descriptions, where the X direction and the Y direction change depending on the position of the laser beam being discussed. For example, in the case where the direction in which a laser beam travels (the Z direction) has changed within the X-Z plane, the orientation of the X direction changes after the change in the direction of travel in accordance with that change in the direction of travel, but the Y direction does not change. On the other hand, in the case where the direction in which a laser beam travels (the Z direction) has changed within the Y-Z plane, the orientation of the Y direction changes after the change in the direction of travel in accordance with that change in the direction of travel, but the X direction does not change. Note that in order to facilitate understanding, in the drawings, coordinate systems are shown as appropriate for a laser beam that is incident on the optical element located furthest upstream among the illustrated optical elements and for a laser beam emitted from the optical element located furthest downstream among the illustrated optical elements. Coordinate systems for a laser beam that is incident on other optical elements are also illustrated as necessary.

3. Variable Spectral Bandwidth Laser Apparatus for Exposure Device

A laser apparatus according to an embodiment of the present disclosure will be described in detail hereinafter with reference to the drawings. In the following embodiment, a laser apparatus that can change a spectral bandwidth will be described as an example.

3.1 Configuration

FIG. 1 schematically illustrates an example of the configuration of the laser apparatus according to the embodiment. A laser apparatus 100 may be a laser apparatus used for semiconductor exposure. A laser apparatus 100 may be a two-stage laser apparatus including an oscillation stage (master oscillator) and an amplification stage (amplifying apparatus).

As shown in FIG. 1, the laser apparatus 100 may include a controller 10, a master oscillator system 20, an amplifying apparatus 50, and a spectral detection unit 60. The laser apparatus 100 may further include an optical system such as high-reflecting mirrors 41 and 42 and a shutter mechanism 70. The laser apparatus 100 may further include a storage unit 11 connected to the controller 10.

The controller 10 may control the laser apparatus 100 as a whole. The controller 10 may be connected to the master oscillator system 20, the amplifying apparatus 50, the spectral detection unit 60, and the shutter mechanism 70. The controller 10 may further be connected to a controller 81 of an exposure device 80.

The master oscillator system 20 may output a laser beam L1. The laser beam L1 may be a pulsed beam.

The master oscillator system 20 may include a grating 21, an amplifier 23, and an output coupling mirror 25. The master oscillator system 20 may further include a wavefront tuning unit 24 and a beam width tuning unit 22 for controlling the spectral bandwidth of the laser beam L1.

The grating 21 and the output coupling mirror 25 may form an optical resonator. A partially-reflective coating may be provided on at least part of the surface of the output coupling mirror 25 on/from which the laser beam L1 is incident/exits. The grating 21 may function as a wavelength selection unit. The amplifier 23 may amplify the laser beam L1 that travels back and forth within the optical resonator. The wavefront tuning unit 24 may tune the wavefront of the laser beam L1 that travels back and forth within the optical resonator. The beam width tuning unit 22 may expand or reduce the beam cross-section of the laser beam L1 that is incident on the grating 21. The amplifier 23, the wavefront tuning unit 24, and the beam width tuning unit 22 may operate under the control of the controller 10.

The optical system such as the high-reflecting mirrors 41 and 42 may be disposed within the optical path between the master oscillator system 20 and the amplifying apparatus 50. The amplifying apparatus 50 may amplify the laser beam L1 that enters the optical system. The amplifying apparatus 50 may contain a gain medium such as an excimer gas in its interior. The amplifying apparatus 50 may operate under the control of the controller 10.

The spectral detection unit 60 may be disposed in the optical path downstream from the amplifying apparatus 50. The spectral detection unit 60 may include a beam splitter 61, a focusing lens 62, and a spectral detector 63. The beam splitter 61 may be disposed in the optical path of the laser beam L1 outputted from the amplifying apparatus 50. The focusing lens 62 may be disposed in the optical path of the laser beam L1 split by the beam splitter 61. An input portion of the spectral detector 63 may be disposed at a focus position, or in the vicinity of the focus position, of the focusing lens 62. The spectral detector 63 may detect the spectral bandwidth of inputted laser beam L1. The spectral detector 63 may output the detected spectral bandwidth of the inputted laser beam L1 to the controller 10.

The shutter mechanism 70 may be disposed in the optical path downstream from the spectral detection unit 60. The shutter mechanism 70 may include a shutter 71 and a driving mechanism 72. The driving mechanism 72 may insert or remove the shutter 71 into or from the optical path of the laser beam L1. The driving mechanism 72 may operate under the control of the controller 10. The laser beam L1 that passes through the shutter mechanism 70 when the shutter 71 is in an open state may be led to the exposure device 80.

3.2 Operations

Next, the general operations of the laser apparatus 100 illustrated in FIG. 1 will be described. The controller 10 may receive, from the controller 81 of the exposure device 80, an exposure command requesting the laser beam L1 for exposure to be outputted. This exposure command may include a spectral bandwidth target value required for the laser beam L1 (a target spectral bandwidth BWt). The controller 10 may drive the shutter mechanism 70 and close the shutter 71 upon receiving the exposure command. Meanwhile, the controller 10 may drive the wavefront tuning unit 24 and the beam width tuning unit 22 so that the spectral bandwidth of the laser beam L1 becomes the requested target spectral bandwidth BWt. The storage unit 11 may store at least one of a control value W of the wavefront tuning unit 24 and a control value M of the beam width tuning unit 22 as data in association with the target spectral bandwidth BWt. The control value W and/or M and the target spectral bandwidth BWt may, for example, be managed as data in a control table or the like. Alternatively, the storage unit 11 may hold data such as functions, parameters, and so on for calculating the control value W and/or M from the target spectral bandwidth BWt. Using the control table or the data such as functions, parameters, or the like read out from the storage unit 11, the controller 10 may obtain the control value W and/or M for obtaining the target spectral bandwidth BWt. The controller 10 may send the obtained control value W and/or M to the wavefront tuning unit 24 and the beam width tuning unit 22 as appropriate. In addition, the controller 10 may drive the amplifier 23 in the master oscillator system 20 to a pumped state. Through this, the laser beam L1 whose spectral bandwidth has been approximately tuned to the target spectral bandwidth BWt can be outputted from the master oscillator system 20.

The controller 10 may drive the amplifying apparatus 50 to a pumped state in synchronization with laser oscillation performed by the master oscillator system 20. Through this, the laser beam L1 outputted from the master oscillator system 20 can be amplified by the amplifying apparatus 50.

The amplified laser beam L1 may be incident on the beam splitter 61 of the spectral detection unit 60. The spectral detection unit 60 may detect a spectral bandwidth BW of the amplified laser beam L1. The detected spectral bandwidth 3W may be sent to the controller 10. The controller 10 may perform feedback control on at least one of the wavefront tuning unit 24 and the beam width tuning unit 22 so that the detected spectral bandwidth BW approaches the target spectral bandwidth BWt.

3.3 Effects

As described thus far, the controller 10 may, upon receiving the target spectral bandwidth BWt from the exposure device 80, find the control value W and/or M of the wavefront tuning unit 24 and the beam width tuning unit 22 for obtaining the target spectral bandwidth BWt by using data within the storage unit 11. In addition, the controller 10 may send the control value W and/or M that has been found to the wavefront tuning unit 24 and/or the beam width tuning unit 22. Through this, the master oscillator system 20 can quickly be adjusted to a state capable of oscillating essentially at the target spectral bandwidth BWt. In addition, the controller 10 performs feedback control on the master oscillator system 20 based on the spectral bandwidth BW detected by the spectral detection unit 60, which makes it possible for the master oscillator system 20 to oscillate essentially at the target spectral bandwidth BWt in a stable manner.

3.4 Relationship Between Spectral Bandwidth and Control Value

Figure 2:
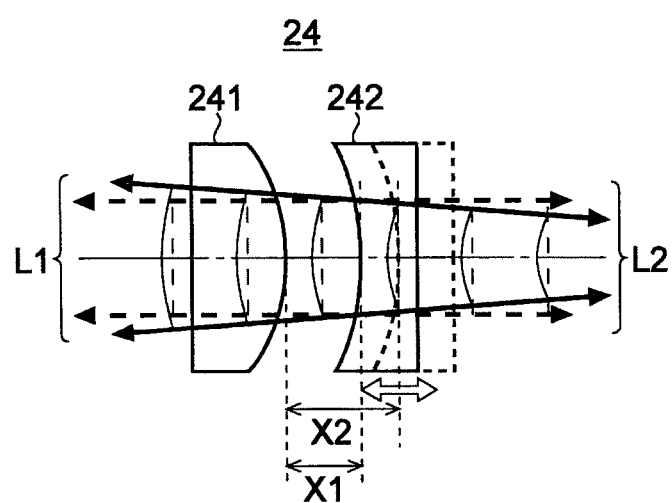
FIG. 2 schematically illustrates the configuration of a wavefront tuning unit according to an embodiment.
Figure 3:
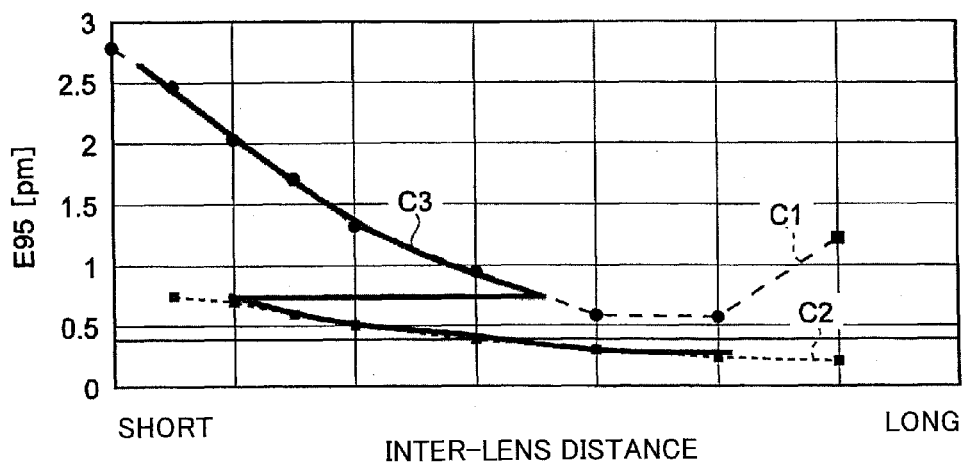
FIG. 3 illustrates a relationship between a distance between lenses in a wavefront tuning unit and a spectral purity E95 when switching between two types of beam widths according to an embodiment.
Figure 4:
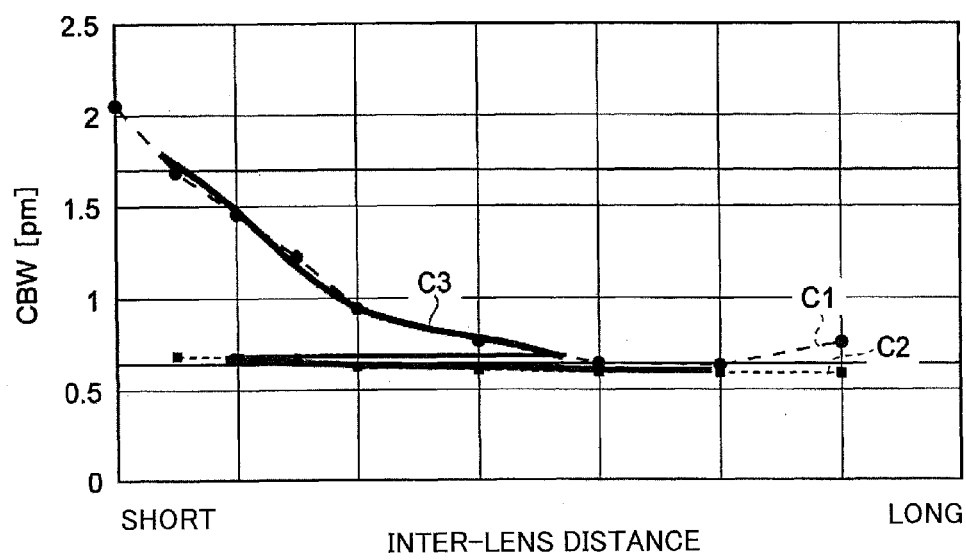
FIG. 4 illustrates a relationship between a distance between lenses and a convolved bandwidth CBW in the case where the vertical axis in FIG. 3 expresses the convolved bandwidth CBW.

Here, a relationship between the spectral bandwidth BW and the control value W and/or M will be described using the drawings. FIG. 2 schematically illustrates the configuration of the wavefront tuning unit 24 used in the present descriptions. FIG. 3 illustrates a relationship between a distance between lenses in the wavefront tuning unit and a spectral purity E95 when switching between two types of beam widths. FIG. 4 illustrates a relationship between a distance between lenses and a convolved bandwidth CBW in the case where the vertical axis in FIG. 3 expresses the convolved bandwidth CBW.

As shown in FIG. 2, the wavefront tuning unit 24 may, for example, include a convex cylindrical lens 241 whose one surface protrudes in a semicylindrical shape and a concave cylindrical lens 242 whose one surface is recessed in a semi-cylindrical shape. The convex cylindrical lens 241 and the concave cylindrical lens 242 may have the same curvature factors. The convex cylindrical lens 241 and the concave cylindrical lens 242 may be disposed so that their curved surfaces face each other. The wavefront of the laser beam L1 can be controlled by changing the distance between the convex cylindrical lens 241 and the concave cylindrical lens 242 along the optical path of the laser beam L1 in this state.

As shown in FIG. 3, when the distance between the convex cylindrical lens 241 and the concave cylindrical lens 242 is changed, the spectral purity E95 of the laser beam L1 can change in accordance with the change in the distance. Likewise, as shown in FIG. 4, when the distance between the convex cylindrical lens 241 and the concave cylindrical lens 242 is changed, the CBW of the laser beam L1 can change in accordance with the change in the distance. This indicates that the spectral bandwidth BW of the laser beam L1 can change in accordance with the change in the wavefront of the laser beam L1. In other words, the spectral bandwidth BW of the laser beam L1 can be controlled by controlling the wavefront of the laser beam L1. Note that in FIGS. 3 and 4, a curve C1 indicates a case where a magnification rate of the beam width tuning unit 22 is taken as M1, whereas a curve C2 indicates a case where the magnification rate of the beam width tuning unit 22 is taken as M2 (<M1).

In addition, the beam width of the laser beam L1 can be changed by changing the magnification rate of the beam width tuning unit 22. For example, in the case where the magnification rate of the beam width tuning unit 22 is switched to one of two magnification rates, the change in the spectral bandwidth BW relative to the change in the wavefront of the laser beam L1 can take on different ranges depending on the magnification rate of the beam width tuning unit 22. To rephrase, the change in the spectral bandwidth BW relative to the change in the wavefront of the laser beam L1 can take on different ranges depending on the beam width of the laser beam L1. Accordingly, the spectral bandwidth BW of the laser beam L1 can be controlled in an optimal range by controlling the magnification rate of the beam width tuning unit 22 in accordance with the target spectral bandwidth BWt. Note that hysteresis control may be used to control the magnification rate of the beam width tuning unit 22.

3.5 Example of Oscillation Stage (Master Oscillator)

Next, the specific configuration of the master oscillator system 20 illustrated in FIG. 1 will be described hereinafter in detail using the drawings as examples.

Figure 5:
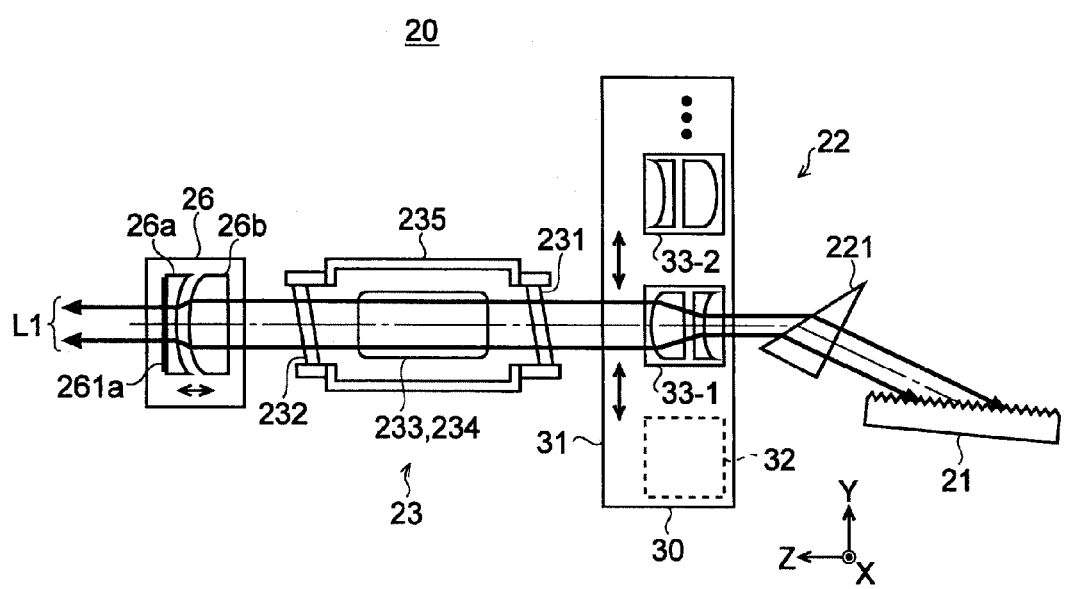
FIG. 5 schematically illustrates an example of the configuration of a master oscillator system according to an embodiment.

FIG. 5 schematically illustrates an example of the configuration of the master oscillator system 20. As shown in FIG. 5, the master oscillator system 20 may include the grating 21, the beam width tuning unit 22, and the amplifier 23. The master oscillator system 20 may include a wavefront tuning unit 26 instead of the wavefront tuning unit 24 and the output coupling mirror 25 shown in FIG. 1.

The wavefront tuning unit 26 may include a concave cylindrical lens 26a and a convex cylindrical lens 26b. The curvature factor of the curved surface of the concave cylindrical lens 26a and the curvature factor of the curved surface of the convex cylindrical lens 26b may be the same. The concave cylindrical lens 26a and the convex cylindrical lens 26b may be disposed so that their curved surfaces face each other. The convex cylindrical lens 26b may be capable of moving along the optical path of the laser beam L1 relative to the concave cylindrical lens 26a. The surface of the concave cylindrical lens 26a on the opposite side of the curved surface may be provided with a partially-reflective coating 261a. The surface of the concave cylindrical lens 26a on which the partially-reflective coating 261a is formed may function as a laser output end of the master oscillator system 20. The concave cylindrical lens 26a and the grating 21 may form an optical resonator.

The amplifier 23 may include a laser chamber 235, windows 231 and 232, and a pair of discharge electrodes 233 and 234. The interior of the laser chamber 235 may be filled with an excimer gas serving as a laser medium. A pumping voltage may be supplied between the discharge electrodes 233 and 234 under the control of the controller 10.

The beam width tuning unit 22 may include a beam width switching module 30 and an optical path tuning prism 221. The beam width switching module 30 may include a moving stage 31 and beam width tuners 33-1 and 33-2. The number of beam width tuners is not limited to two. The beam width tuners 33-1 and 33-2 may have mutually different magnification rates. The beam width switching module 30 may include a space 32 in which a beam width tuner is not disposed. The moving stage 31 may move, due to a driving mechanism (not shown), in the Y or X direction that is respectively perpendicular to the optical path of the laser beam L1. Through this, one of the beam width tuners 33-1, 33-2, and the space 32 may be selectively disposed within the optical path of the laser beam L1. The beam width tuner 33-1, 33-2, or the space 32 may not essentially change the optical axis of the laser beam L1 from before to after the laser beam L1 passes through those elements. In other words, the beam width tuners 33-1 and 33-2 may change only the beam width of the laser beam L1, without changing the optical axis of the laser beam L1. The optical path tuning prism 221 may determine the optical path of the laser beam L1 that travels back and forth within the optical resonator and the angle at which the laser beam L1 is incident on the grating 21. The optical path tuning prism 221 may be anchored to a frame (not shown) capable of reducing vibrations.

3.5.1 Beam Width Tuner Using Cylindrical Lens

Figure 6:
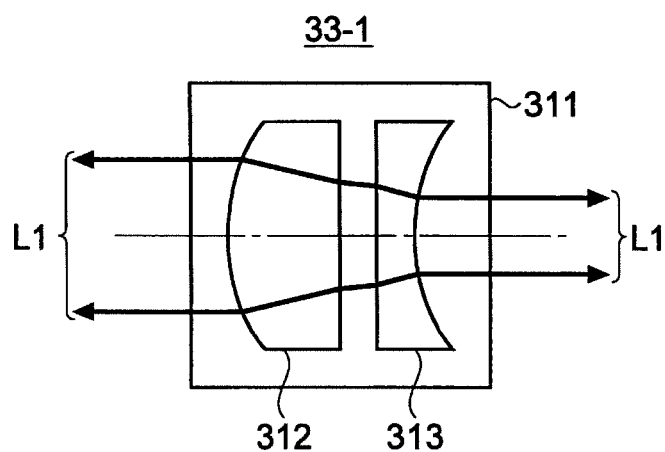
FIG. 6 illustrates an example of a beam width tuner illustrated in FIG. 5.
Figure 7:
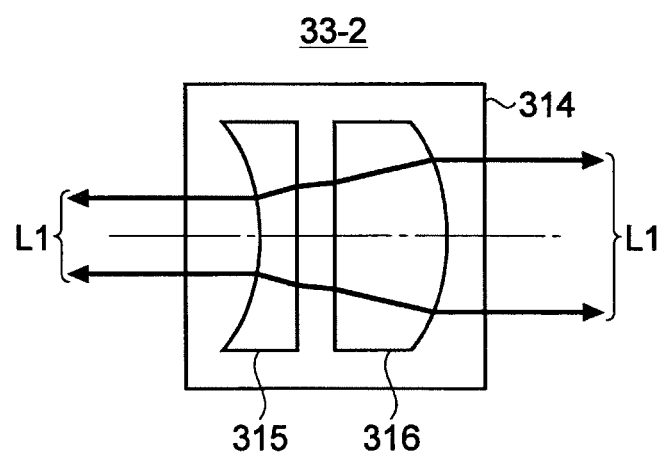
FIG. 7 illustrates another example of the beam width tuner illustrated in FIG. 5.

Here, examples of the beam width tuners 33-1 and 33-2 configured using cylindrical lenses are illustrated in FIGS. 6 and 7. FIG. 6 schematically illustrates an example of the configuration of the reduction system beam width tuner 33-1. FIG. 7 schematically illustrates an example of the configuration of the expanding system beam width tuner 33-2.

As shown in FIG. 6, the reduction system beam width tuner 33-1 may include a frame 311, a convex cylindrical lens 312 whose one surface protrudes in a semicylindrical shape, and a concave cylindrical lens 313 whose one surface is recessed in a semicylindrical shape. The convex cylindrical lens 312 and the concave cylindrical lens 313 may be anchored to the frame 311. The frame 311 may be anchored to the moving stage 31 shown in FIG. 5.

The convex cylindrical lens 312 may be disposed so that the convex surface faces toward a front edge (toward the laser output end). The concave cylindrical lens 313 may be disposed so that the concave surface faces a rear edge (toward the grating). The convex cylindrical lens 312 and the concave cylindrical lens 313 may be disposed so that their flat surfaces on the opposite sides as the curved surfaces face each other. This enables the beam width of the laser beam L1 that passes through the beam width tuner 33-1 from the front edge side to the rear edge side to be reduced.

As shown in FIG. 7, the expanding system beam width tuner 33-2 may include a frame 314, a concave cylindrical lens 315 whose one surface is recessed in a semicylindrical shape, and a convex cylindrical lens 316 whose one surface protrudes in a semicylindrical shape. The concave cylindrical lens 315 and the convex cylindrical lens 316 may be anchored to the frame 314. The frame 314 may be anchored to the moving stage 31 shown in FIG. 5.

The concave cylindrical lens 315 may be disposed so that the concave surface faces the front edge. The convex cylindrical lens 316 may be disposed so that the convex surface faces the rear edge. The concave cylindrical lens 315 and the convex cylindrical lens 316 may be disposed so that their flat surfaces on the opposite sides as the curved surfaces face each other. This enables the beam width of the laser beam L1 that passes through the beam width tuner 33-2 from the front edge side to the rear edge side to be expanded.

The beam width tuning unit 22 may move the beam width tuner using the moving stage 31 connected to the driving mechanism (not shown). Through this, one of the beam width tuners 33-1, 33-2, and the space 32 can be selectively disposed within the optical path of the laser beam L1. As a result, the beam width of the laser beam L1 that is incident on the grating 21 can be changed at the magnification rates set in the beam width tuners 33-1, 33-2, and the space 32, respectively. Note that the magnification rate of the space 32 is 1.

3.5.2 Beam Width Tuner Using Prism

Figure 8:
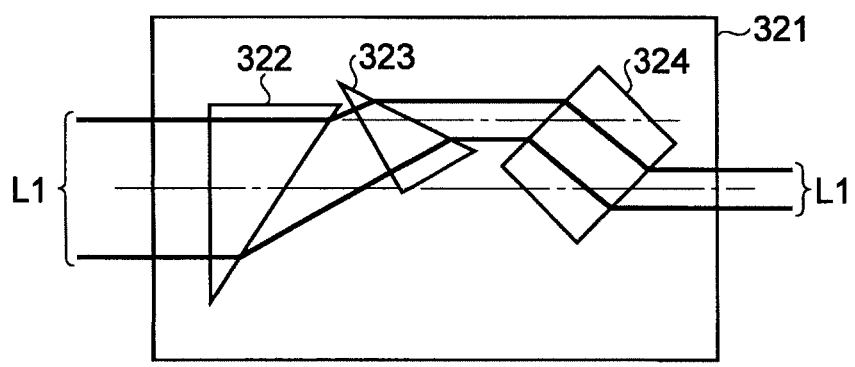
FIG. 8 illustrates yet another example of the beam width tuner illustrated in FIG. 5.
Figure 9:
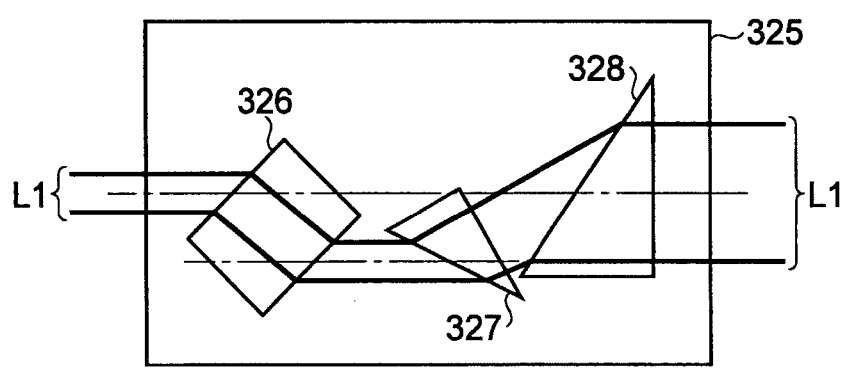
FIG. 9 illustrates yet another example of the beam width tuner illustrated in FIG. 5.

FIGS. 8 and 9 respectively illustrate examples of beam width tuners 33-3 and 33-4 configured using prisms. FIG. 8 schematically illustrates an example of the configuration of the reduction system beam width tuner 33-3. FIG. 9 schematically illustrates an example of the configuration of the expanding system beam width tuner 33-4.

As shown in FIG. 8, the reduction system beam width tuner 33-3 may include a frame 321, two prisms 322 and 323, and a cube prism 324. The prisms 322 and 323 and the cube prism 324 may be anchored to the frame 321. The frame 321 may be anchored to the moving stage 31 shown in FIG. 5.

The prisms 322 and 323 may be rectangular prisms. The optical axis of the laser beam L1 that passes through the prism 322 from the front edge side may be changed to an optical axis that is parallel to the original optical axis by the laser beam L1 passing through the prism 323. At this time, the beam width of the laser beam L1 may be reduced. The cube prism 324 may return the optical axis of the laser beam L1 that travels parallel to the original optical axis to an extension of the original optical axis. This enables the beam width of the laser beam L1 that passes through the beam width tuner 33-3 from the front edge side toward the grating 21 to be reduced without changing the optical axis of the laser beam L1.

As shown in FIG. 9, the expanding system beam width tuner 33-4 may include a frame 325, a cube prism 326, and two prisms 327 and 328. The cube prism 326 and the prisms 327 and 328 may be anchored to the frame 325. The frame 325 may be anchored to the moving stage 31 shown in FIG. 5.

The prisms 327 and 328 may be rectangular prisms. The optical axis of the laser beam L1 that passes through the cube prism 326 from the front edge side may be changed to an optical axis that is parallel to the original optical axis. The prisms 327 and 328 may return the optical axis of the laser beam L1 that travels parallel to the original optical axis to an extension of the original optical axis. At this time, the beam width of the laser beam L1 may be expanded. This enables the beam width of the laser beam L1 that passes through the beam width tuner 33-4 from the front edge side toward the grating 21 to be expanded without changing the optical axis of the laser beam L1.

The beam width tuning unit 22 may move the beam width tuner using the moving stage 31 connected to the driving mechanism (not shown). Through this, one of the beam width tuners 33-3, 33-4, and the space 32 can be selectively disposed within the optical path of the laser beam L1. As a result, the beam width of the laser beam L1 that is incident on the grating 21 can be changed at the magnification rates set in the beam width tuners 33-3, 33-4, and the space 32, respectively.

3.6 First Variation on Oscillation Stage (Master Oscillator)

Next, a first variation on the master oscillator system 20 illustrated in FIG. 1 will be described in detail using the drawings.

Figure 10:
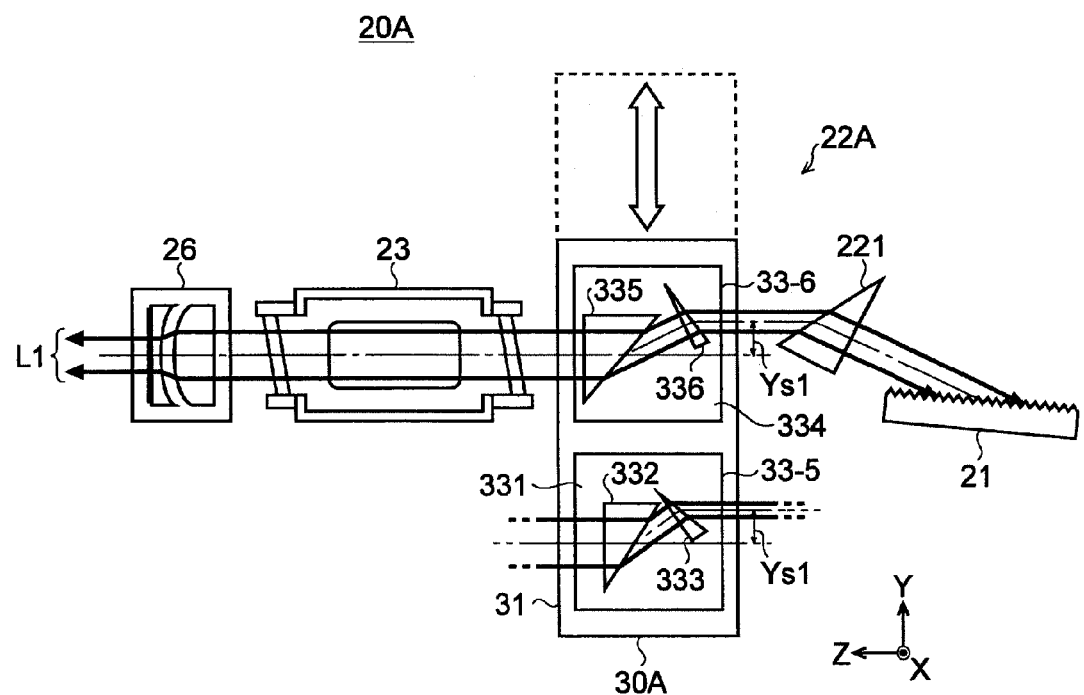
FIG. 10 schematically illustrates an example of the configuration of a master oscillator system according to a first variation.

FIG. 10 schematically illustrates an example of the configuration of a master oscillator system 20A according to the first variation. As shown in FIG. 10, the master oscillator system 20A may have the same configuration as the master oscillator system 20 shown in FIG. 5, with a beam width tuning unit 22A replacing the beam width tuning unit 22. The beam width tuning unit 22A, meanwhile, may have the same configuration as the beam width tuning unit 22, with a beam width switching module 30A replacing the beam width switching module 30. The beam width switching module 30A can, like the beam width switching module 30, include one or more beam width tuners 33-5 and 33-6. The number of beam width tuners is not limited to two. Each of the beam width tuners 33-5 and 33-6 may change the optical axis of the laser beam L1 between the light entry side and the light exit side thereof. In the present example, the optical axis of the laser beam L1 is shifted parallel by, for example, a predetermined distance (an optical axis shift amount Ys1). The optical axis shift amount Ys1 may be the same for the beam width tuners 33-5 and 33-6, respectively. It is preferable for the optical path tuning prism 221 and the grating 21 to be positioned in accordance with this optical axis shift.

3.6.1 Beam Width Tuner (Reduction System) Using Prism

Here, examples of the reduction system beam width tuners 33-5 and 33-6 configured using prisms will be described using FIG. 10.

As shown in FIG. 10, the reduction system beam width tuner 33-5 may include a frame 331 and two prisms 332 and 333. The prisms 332 and 333 may be anchored to the frame 331. The frame 331 may be anchored to the moving stage 31 shown in FIG. 10.

The prisms 332 and 333 may be rectangular prisms. The optical axis of the laser beam L1 that passes through the prism 332 from the front edge side may be changed to an optical axis that is parallel to the original optical axis by the laser beam L1 passing through the prism 333. At this time, the beam width of the laser beam L1 may be reduced. This enables the beam width of the laser beam L1 that passes through the beam width tuner 33-5 from the front edge side toward the grating 21 to be reduced. In addition, the optical axis of the laser beam L1 may be shifted parallel by a predetermined distance (the optical axis shift amount Ys1).

In addition, as also shown in FIG. 10, the reduction system beam width tuner 33-6 may include a frame 334 and two prisms 335 and 336. The prisms 335 and 336 may be anchored to the frame 334. The frame 334 may be anchored to the moving stage 31 shown in FIG. 10.

The prisms 335 and 336 may be rectangular prisms. The optical axis of the laser beam L1 that passes through the prism 335 from the front edge side may be changed to an optical axis that is parallel to the original optical axis by the laser beam L1 passing through the prism 336. At this time, the optical axis of the laser beam L1 may be shifted parallel by the same predetermined distance as the beam width tuner 33-5 (the optical axis shift amount Ys1). The optical axis shift amount Ys1 may be the same for both the beam width tuners 33-5 and 33-6. However, the magnification rates of the prisms 335 and 336 may be different from the magnification rates of the prisms 332 and 333.

The beam width tuning unit 22A may selectively dispose one of the beam width tuners 33-5 and 33-6 in the optical path of the laser beam L1 using the moving stage 31 connected to the driving mechanism (not shown). As a result, the beam width of the laser beam L1 that is incident on the grating 21 can be changed at the magnification rates set in the beam width tuners 33-5 and 33-6, respectively.

3.6.2 Beam Width Tuner (Expanding System) Using Prism

Next, examples of expanding system beam width tuners 33-7 and 33-8 configured using prisms will be described using FIGS. 11 and 12.

Figure 11:
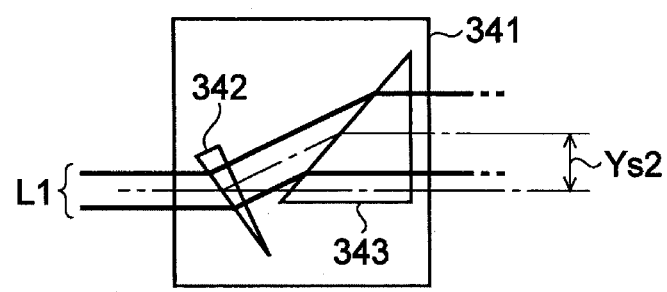
FIG. 11 illustrates an example of a beam width tuner illustrated in FIG. 10.

As shown in FIG. 11, the expanding system beam width tuner 33-7 may include a frame 341 and two prisms 342 and 343. The prisms 342 and 343 may be anchored to the frame 341. The frame 341 may be anchored to the moving stage 31 shown in FIG. 10.

The prisms 342 and 343 may be rectangular prisms. The optical axis of the laser beam L1 that passes through the prism 342 from the front edge side may be changed to an optical axis that is parallel to the original optical axis by the laser beam L1 passing through the prism 343. At this time, the beam width of the laser beam L1 may be expanded. This enables the beam width of the laser beam L1 that passes through the beam width tuner 33-7 from the front edge side toward the grating 21 to be expanded. In addition, the optical axis of the laser beam L1 may be shifted parallel by a predetermined distance (an optical axis shift amount Ys2).

Figure 12:
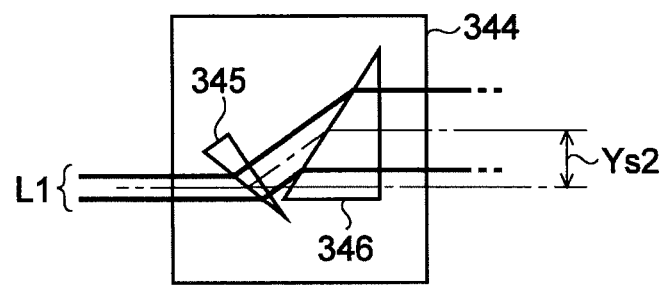
FIG. 12 illustrates another example of the beam width tuner illustrated in FIG. 10.

In addition, as also shown in FIG. 12, the expanding system beam width tuner 33-8 may include a frame 344 and two prisms 345 and 346. The prisms 345 and 346 may be anchored to the frame 344. The frame 344 may be anchored to the moving stage 31 shown in FIG. 10.

The prisms 345 and 346 may be rectangular prisms. The optical axis of the laser beam L1 that passes through the prism 345 from the front edge side may be changed to an optical axis that is parallel to the original optical axis by the laser beam L1 passing through the prism 346. At this time, the optical axis of the laser beam L1 may be shifted parallel by the same predetermined distance as the beam width tuner 33-7 (the optical axis shift amount Ys2). The optical axis shift amount Ys2 may be the same for both the beam width tuners 33-7 and 33-8. However, the magnification rates of the prisms 345 and 346 may be different from the magnification rates of the prisms 342 and 343.

The beam width tuning unit 22A may selectively dispose one of the beam width tuners 33-7 and 33-8 in the optical path of the laser beam L1 using the moving stage 31 connected to the driving mechanism (not shown). As a result, the beam width of the laser beam L1 that is incident on the grating 21 can be changed at the magnification rates set in the beam width tuners 33-7 and 33-8, respectively.

3.6.3 Beam Width Tuner Using Cylindrical Mirror

Figure 13:
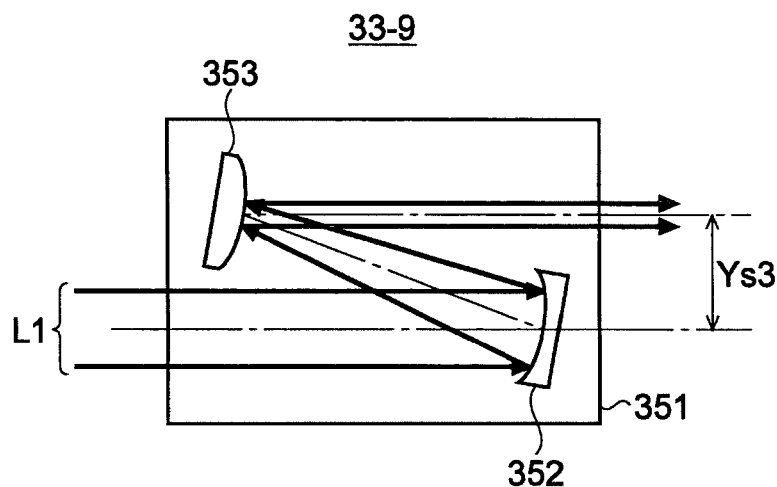
FIG. 13 illustrates yet another example of the beam width tuner illustrated in FIG. 10.
Figure 14:
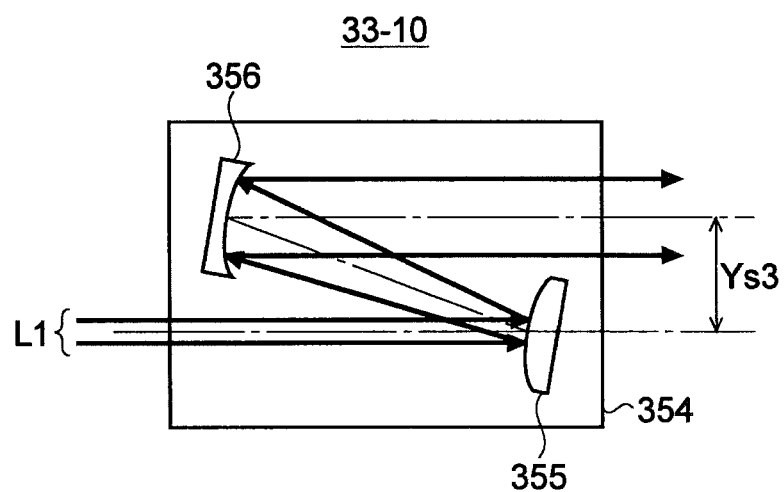
FIG. 14 illustrates yet another example of the beam width tuner illustrated in FIG. 10.

Next, examples of beam width tuners 33-9 and 33-10 configured using cylindrical mirrors will be described. FIG. 13 schematically illustrates an example of the configuration of a reduction system beam width tuner 33-9. FIG. 14 schematically illustrates an example of the configuration of an expanding system beam width tuner 33-10.

As shown in FIG. 13, the reduction system beam width tuner 33-9 may include a frame 351, a concave cylindrical mirror 352 whose one surface is recessed in a semicylindrical shape, and a convex cylindrical mirror 353 whose one surface protrudes in a semicylindrical shape. The concave cylindrical mirror 352 and the convex cylindrical mirror 353 may be anchored to the frame 351. The frame 351 may be anchored to the moving stage 31 shown in FIG. 10.

The laser beam L1 that has entered the beam width tuner 33-9 may be reflected by the concave cylindrical mirror 352. As a result, the laser beam L1 may be converted into a reduced beam. This reduced beam may then be reflected by the convex cylindrical mirror 353. Through this, the laser beam L1 that was a reduced beam may be converted into a laser beam L1 that is parallel beam. As a result, the beam width of the laser beam L1 that advances via the beam width tuner 33-9 from the front edge side toward the grating 21 can be reduced. In addition, by being reflected by the concave cylindrical mirror 352 and the convex cylindrical mirror 353, the optical axis of the laser beam L1 may be shifted parallel by a predetermined distance (an optical axis shift amount Ys3).

As shown in FIG. 14, the expanding system beam width tuner 33-10 may include a frame 354, a convex cylindrical mirror 355 whose one surface protrudes in a semicylindrical shape, and a concave cylindrical mirror 356 whose one surface is recessed in a semicylindrical shape. The convex cylindrical mirror 355 and the concave cylindrical mirror 356 may be anchored to the frame 354. The frame 354 may be anchored to the moving stage 31 shown in FIG. 10.

The laser beam L1 that has entered the beam width tuner 33-10 may be reflected by the convex cylindrical mirror 355. As a result, the laser beam L1 may be converted into an expanded beam. This expanded beam may then be reflected by the concave cylindrical mirror 356. Through this, the laser beam L1 that was an expanded beam may be converted into a laser beam L1 that is a parallel beam. As a result, the beam width of the laser beam L1 that advances via the beam width tuner 33-10 from the front edge side toward the grating 21 can be expanded. In addition, by being reflected by the convex cylindrical mirror 355 and the concave cylindrical mirror 356, the optical axis of the laser beam L1 may be shifted parallel by a predetermined distance (the optical axis shift amount Ys3).

The beam width tuning unit 22A may selectively dispose one of the beam width tuners 33-9 and 33-10 in the optical path of the laser beam L1 using the moving stage 31 connected to the driving mechanism (not shown). The number of beam width tuners is not limited to two. As a result, the beam width of the laser beam L1 that is incident on the grating 21 can be changed at the magnification rates set in the beam width tuners 33-9 and 33-10, respectively.

3.7 Second Variation on Oscillation Stage (Master Oscillator)

Figure 15:
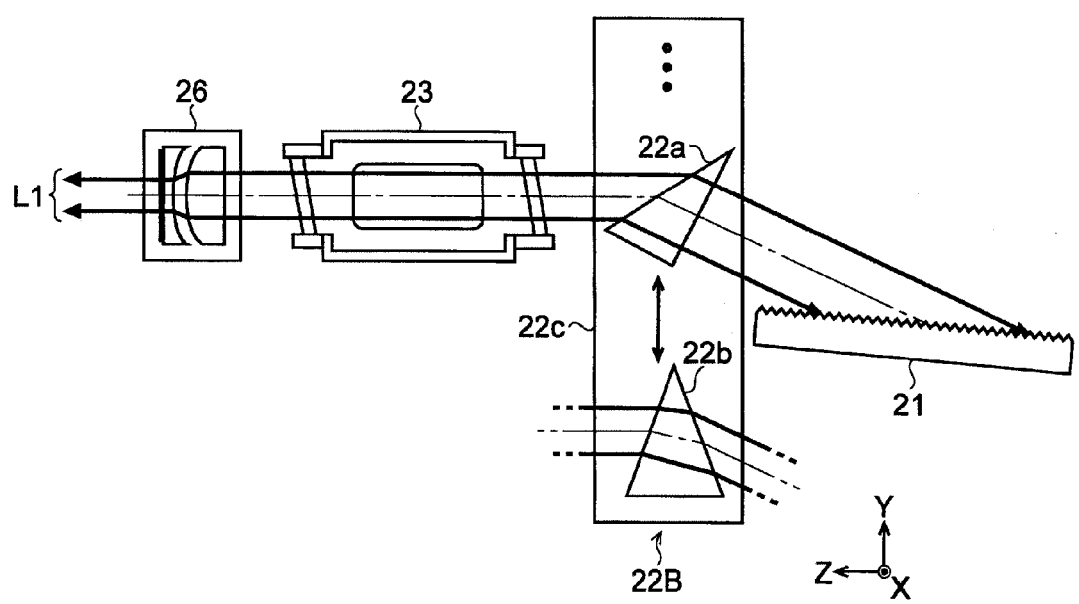
FIG. 15 schematically illustrates an example of the configuration of a master oscillator system according to a second variation.

Next, a second variation on the master oscillator system 20 illustrated in FIG. 1 will be described in detail using the drawings In the second variation, an optical path tuning prism that tunes the optical path through which the laser beam L1 is incident on the grating 21 may be used in the beam width tuning unit. FIG. 15 schematically illustrates an example of the configuration of a master oscillator system 203 according to the second variation. As shown in FIG. 15, the master oscillator system 20B may have the same configuration as the master oscillator system 20 shown in FIG. 5, with a beam width tuning unit 22B replacing the beam width tuning unit 22.

3.7.1 Beam Width Tuner Using Optical Path Tuning Prism

As shown in FIG. 15, the beam width tuning unit 22B may include a moving stage 22c and a plurality of optical path tuning prisms 22a and 22b. The number of optical path tuning prisms is not limited to two. When the optical path tuning prism 22a or 22b is disposed in the optical path, the laser beam L1 that has been incident on the optical path tuning prism 22a or 22b from the front edge side may be emitted along the same optical axis in both cases. However, it is preferable for the beam widths of the laser beam L1 emitted from the optical path tuning prism 22a or 22b to be different. The beam width tuning unit 22B may selectively dispose one of the optical path tuning prisms 22a and 22b in the optical path of the laser beam L1 using the moving stage 22c connected to a driving mechanism (not shown). As a result, the beam width of the laser beam L1 that is incident on the grating 21 can be changed at the magnification rates set in the optical path tuning prisms 22a and 22b, respectively.

3.7.2 Beam Width Tuner Using Plurality of Optical Path Tuning Prisms (First Example)

Figure 16:
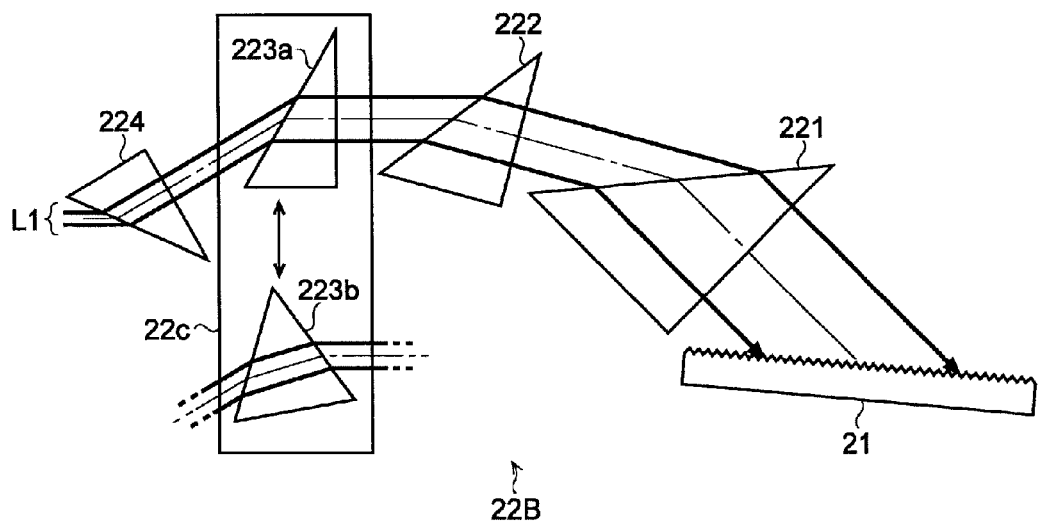
FIG. 16 illustrates an example of a beam width tuner illustrated in FIG. 15.
Figure 17:
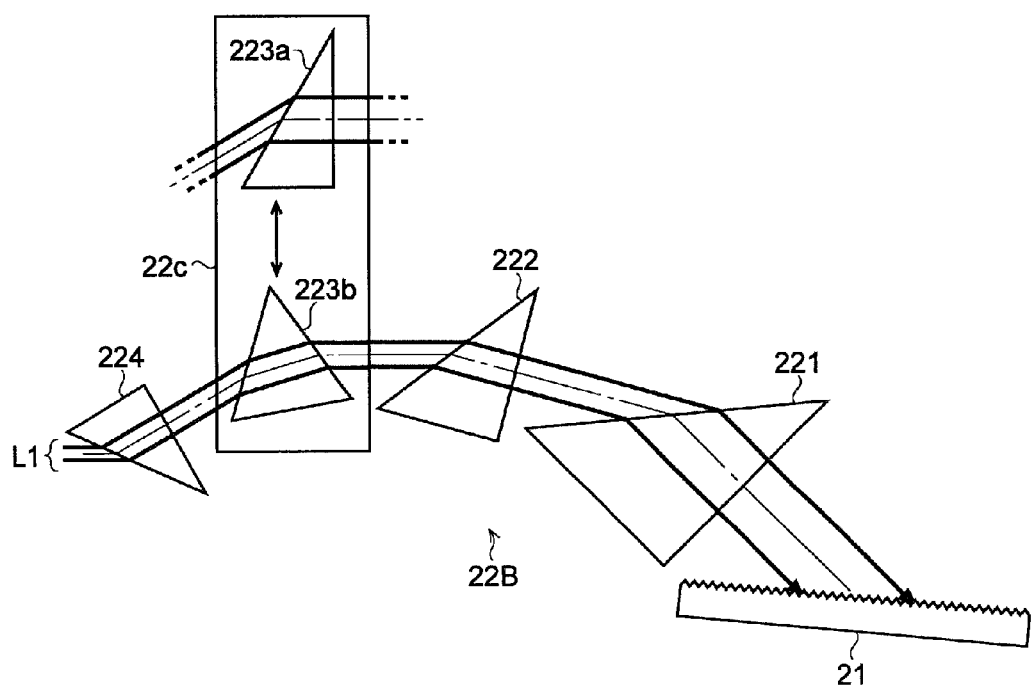
FIG. 17 illustrates another state of the beam width tuner illustrated in FIG. 16.

In addition, a plurality of optical path tuning prisms may be used, and one of those optical path tuning prisms may be used as the beam width tuner. FIGS. 16 and 17 schematically illustrate an example of the configuration of the beam width tuning unit 22B in which one of the plurality of optical path tuning prisms is used as the beam width tuner.

As shown in FIGS. 16 and 17, the beam width tuning unit 223 may include a plurality of optical path tuning prisms 221, 222, 223a, 223b, and 224. Of these, it is preferable for the optical path tuning prism 223a to be capable of being swapped with the optical path tuning prism 223b in the optical path of the laser beam L1. FIG. 16 illustrates a case where the optical path tuning prism 223a is disposed in the optical path, whereas FIG. 17 illustrates a case where the optical path tuning prism 223b is disposed in the optical path.

The laser beam L1 that has been incident on the optical path tuning prism 223a from the front edge side may be emitted along the same optical axis as the optical axis of the laser beam L1 that has been incident on the optical path tuning prism 223b from the same front edge side. However, it is preferable for the beam width of the laser beam L1 emitted from the optical path tuning prism 223a and the beam width of the laser beam L1 emitted from the optical path tuning prism 223b to be different.

The optical path tuning prisms 223a and 223b may be mounted on the moving stage 22c. The beam width tuning unit 22B may selectively dispose one of the optical path tuning prisms 223a and 223b in the optical path of the laser beam L1 using the moving stage 22c connected to the driving mechanism (not shown). As a result, the beam width of the laser beam L1 that is incident on the grating 21 can be changed at the magnification rates set in the optical path tuning prisms 223a and 223b, respectively.

3.7.3 Beam Width Tuner Using Plurality of Optical Path Tuning Prisms (Second Example)

Figure 18:
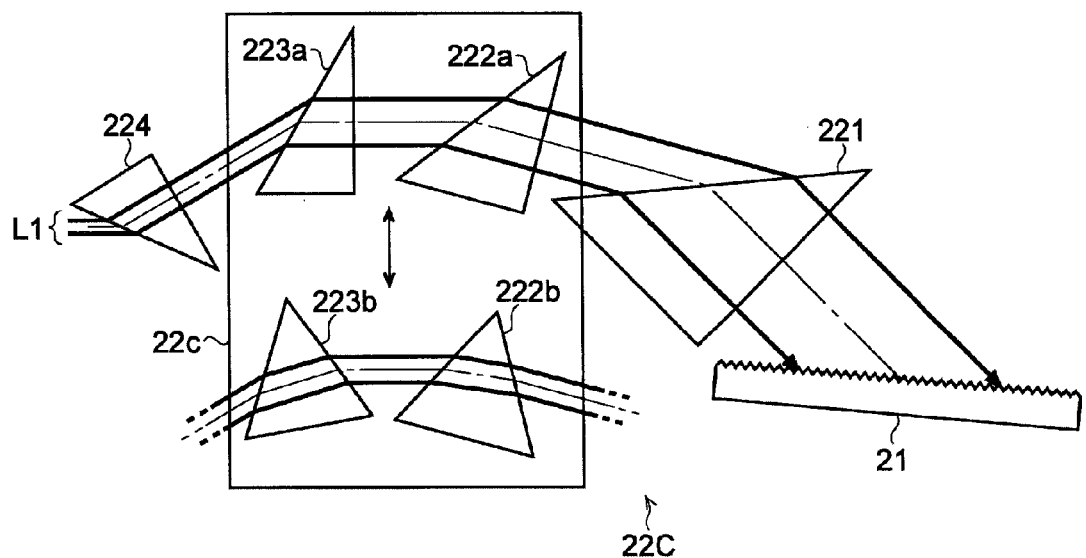
FIG. 18 illustrates another example of the beam width tuner illustrated in FIG. 15.
Figure 19:
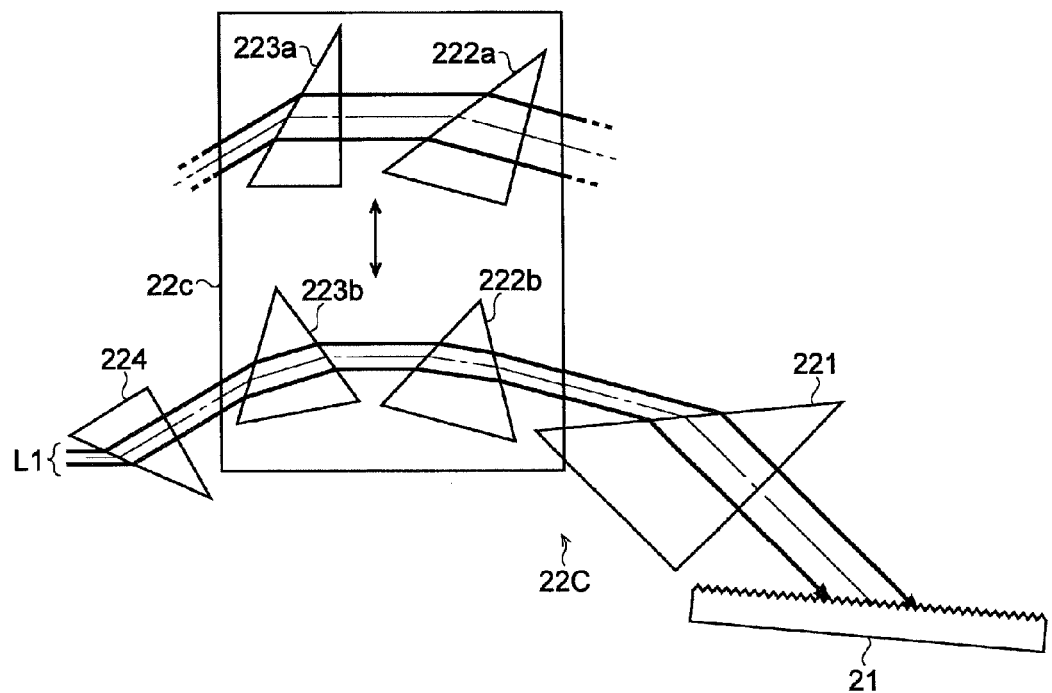
FIG. 19 illustrates another state of the beam width tuner illustrated in FIG. 18.

In addition, a plurality of optical path tuning prisms may be used, and a plurality of those optical path tuning prisms may be used as the beam width tuner. FIGS. 18 and 19 schematically illustrate examples of the configuration of a beam width tuning unit 22C in which the middle two optical path tuning prisms of four optical path tuning prisms are used as the beam width tuner.

As shown in FIGS. 18 and 19, the beam width tuning unit 22C may include a plurality of optical path tuning prisms 221, 222a, 222b, 223a, 223b, and 224. Of these, it is preferable for the optical path tuning prisms 222a and 223a to be capable of being swapped with the optical path tuning prisms 222b and 223b in the optical path of the laser beam L1. FIG. 18 illustrates a case where the optical path tuning prisms 222a and 223a are disposed in the optical path, whereas FIG. 19 illustrates a case where the optical path tuning prisms 222b and 223b are disposed in the optical path.

The laser beam L1 that has entered the optical path tuning prisms 222a and 223a from the front edge side as shown in FIG. 18 may be emitted along the same optical axis as the optical axis of the laser beam L1 that has entered the optical path tuning prisms 222b and 223b from the front edge side as shown in FIG. 19. However, it is preferable for the beam width of the laser beam L1 emitted toward the grating 21 from the optical path tuning prism 222a as shown in FIG. 18 to be different from the beam width of the laser beam L1 emitted toward the grating 21 from the optical path tuning prism 222b as shown in FIG. 19.

The optical path tuning prisms 222a, 222b, 223a, and 223b may be mounted on the moving stage 22c. The beam width tuning unit 22C may selectively dispose one of a combination of the optical path tuning prisms 222a and 223a and a combination of the optical path tuning prisms 222b and 223b in the optical path of the laser beam L1 using the moving stage 22c connected to the driving mechanism (not shown). As a result, the beam width of the laser beam L1 that is incident on the grating 21 can be changed at the magnification rates set in the respective combinations of the optical path tuning prisms.

3.7.4 Beam Width Tuner Using Plurality of Optical Path Tuning Prisms (Third Example)

Figure 20:
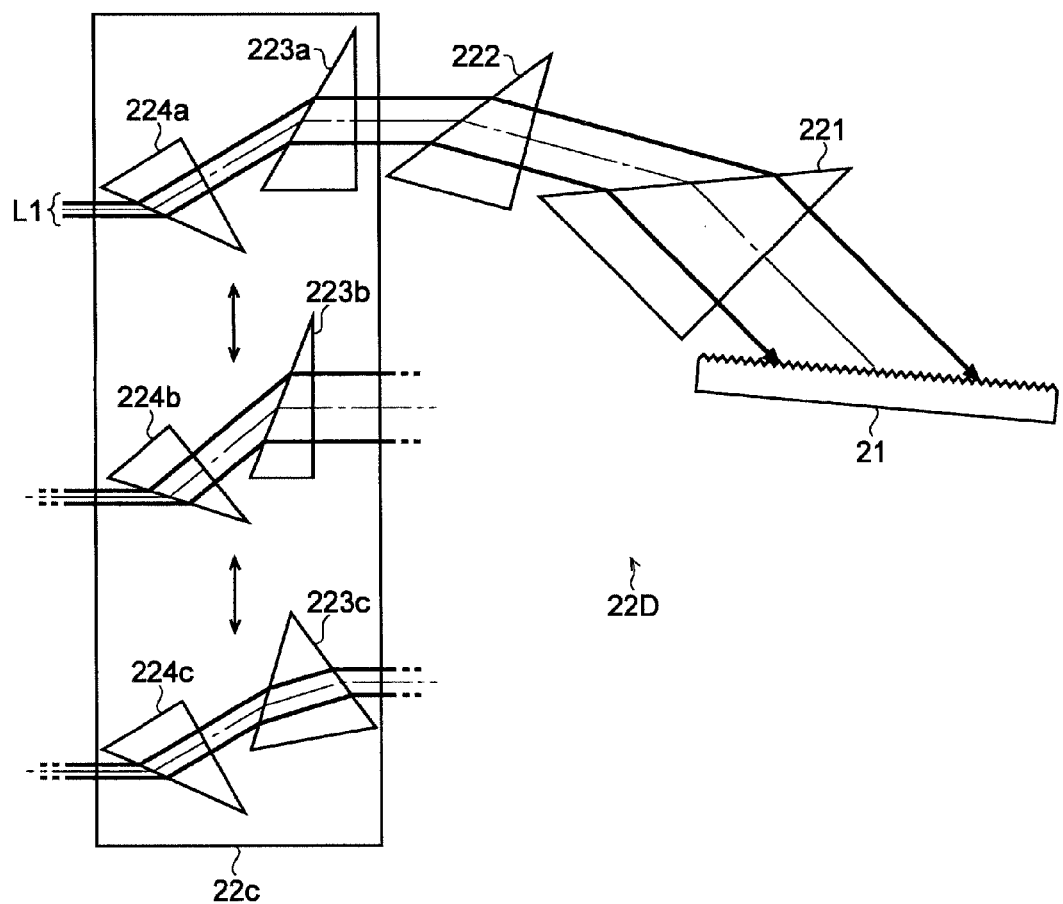
FIG. 20 illustrates yet another example of the beam width tuner illustrated in FIG. 15.
Figure 21:
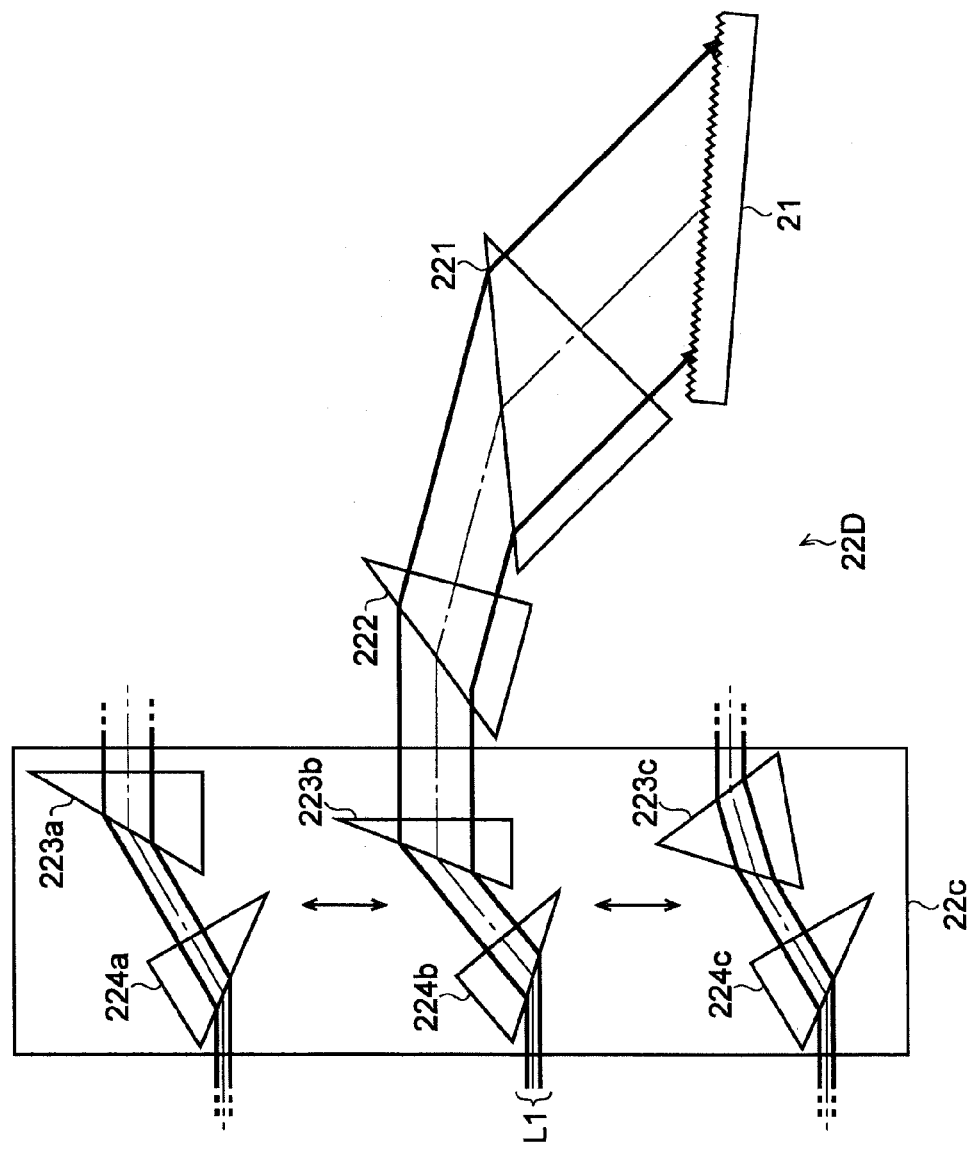
FIG. 21 illustrates another state of the beam width tuner illustrated in FIG. 20.
Figure 22:
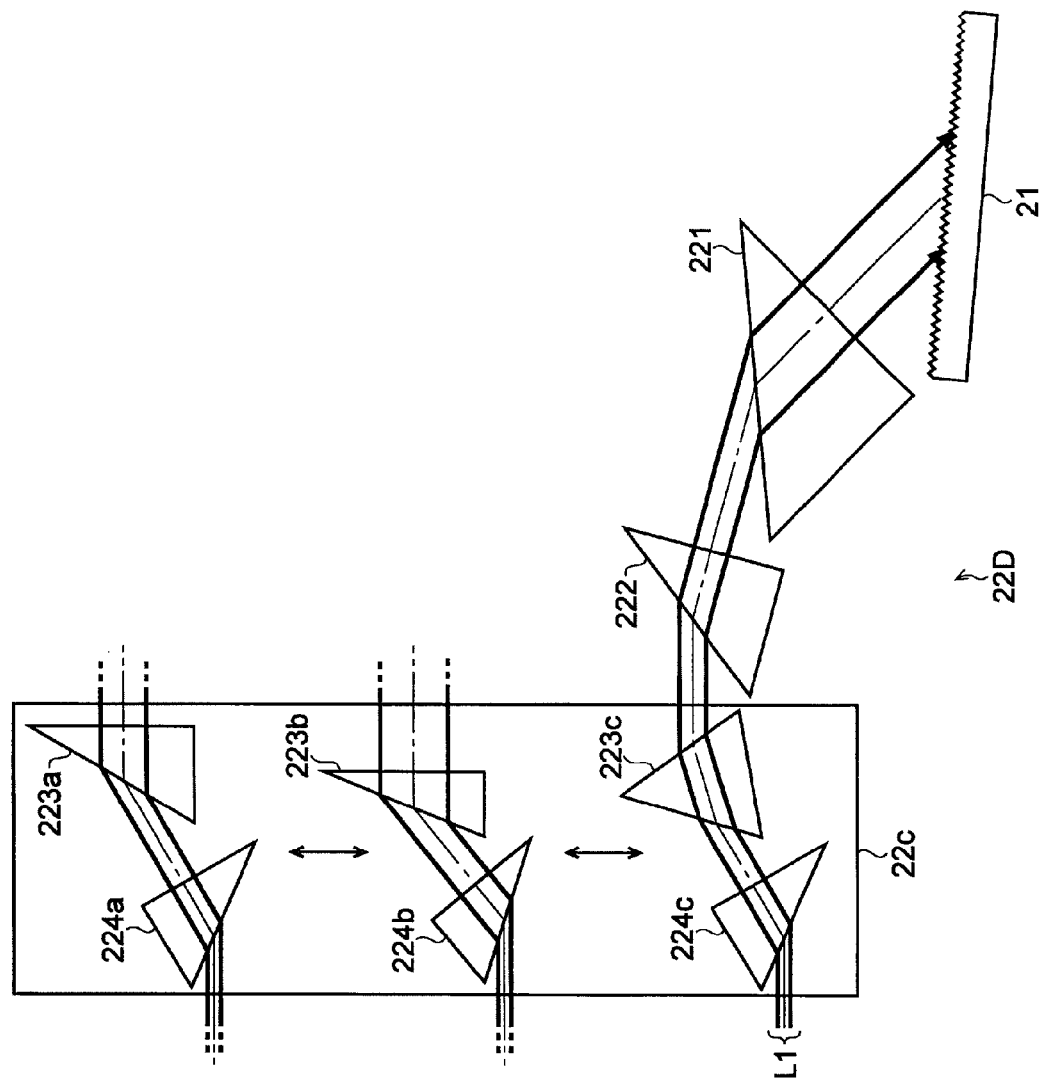
FIG. 22 illustrates yet another state of the beam width tuner illustrated in FIG. 20.

In addition, a plurality of optical path tuning prisms may be used, and one or more optical path tuning prisms including the optical path tuning prism located closest to the front edge side may be used as the beam width tuner. FIGS. 20 through 22 schematically illustrate an example of the configuration of a beam width tuning unit 22D in which, of four optical path tuning prisms, the two optical path tuning prisms that are closest to the front edge side are used as the beam width tuner.

As shown in FIGS. 20 through 22, the beam width tuning unit 22D may include a plurality of optical path tuning prisms 221, 222, 223a through 223c, and 224a through 224c. Of these, it is preferable for a combination of the optical path tuning prisms 223a and 224a, a combination of the optical path tuning prisms 223b and 224b, and a combination of the optical path tuning prisms 223c and 224c to be capable of being swapped with one another in the optical path of the laser beam L1. FIG. 20 illustrates a case where the combination of the optical path tuning prisms 223a and 224a is disposed in the optical path. FIG. 21 illustrates a case where the combination of the optical path tuning prisms 223b and 224b is disposed in the optical path. FIG. 22 illustrates a case where the combination of the optical path tuning prisms 223c and 224c is disposed in the optical path.

The optical axis of the laser beam L1 that has entered the optical path tuning prisms 223a and 224a from the front edge side as shown in FIG. 20 may be emitted along the same optical axis as the optical axis of the laser beam L1 that has entered the combination of the optical path tuning prisms 223b and 224b from the front edge side as shown in FIG. 21 and the optical axis of the laser beam L1 that has entered the combination of the optical path tuning prisms 223c and 224c as shown in FIG. 22. However, it is preferable for the beam width of the laser beam L1 emitted from the optical path tuning prism 223a as shown in FIG. 20 to be different from the beam width of the laser beam L1 emitted toward the grating 21 from the optical path tuning prism 223b as shown in FIG. 21. Likewise, it is preferable for the beam width of the laser beam L1 emitted from the optical path tuning prism 223b as shown in FIG. 21 to be different from the beam width of the laser beam L1 emitted toward the grating 21 from the optical path tuning prism 223c as shown in FIG. 22.

The optical path tuning prisms 223a through 223c and 224a through 224c may be mounted on the moving stage 22c. The beam width tuning unit 22D may selectively dispose one of the combination of the optical path tuning prisms 223a and 224a, the combination of the optical path tuning prisms 223b and 224b, and the combination of the optical path tuning prisms 223c and 224c in the optical path of the laser beam L1 using the moving stage 22c connected to a driving mechanism (not shown). As a result, the beam width of the laser beam L1 that is incident on the grating 21 can be changed at the magnification rates set in the respective combinations of the optical path tuning prisms.

3.7.5 Beam Width Tuner Using Plurality of Optical Path Tuning Prisms (Fourth Example)

Figure 23:
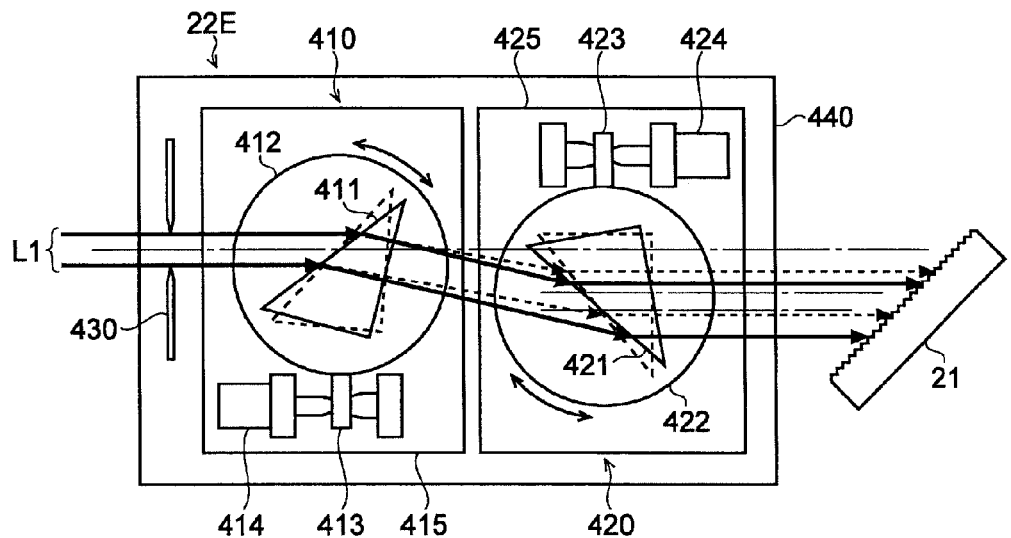
FIG. 23 illustrates yet another example of the beam width tuner illustrated in FIG. 15.

Meanwhile, in the case where the beam width tuning unit is configured using a plurality of optical path tuning prisms, the beam width can also be controlled while tuning the optical path by rotating the respective optical path tuning prisms. FIG. 23 schematically illustrates an example of the configuration of a beam width tuning unit 22E in which a plurality of optical path tuning prisms held in rotatable states are used as the beam width tuner.

As shown in FIG. 23, the beam width tuning unit 22E may include optical path tuning units 410 and 420, a pinhole 430, and a frame 440. The optical path tuning units 410 and 420 and the pinhole 430 may be anchored to the frame 440.

The pinhole 430 may be disposed in the beam width tuning unit 22E toward the front edge side. The pinhole 430 may shape the contour of the beam cross-section of the laser beam L1 that passes therethrough.

The optical path tuning unit 410 may include an optical path tuning prism 411, a rotating plate 412, a protrusion 413, a stepping motor 414, and a stage 415. The optical path tuning prism 411 may be anchored upon the rotating plate 412. The rotating plate 412 may be held in a rotatable state on the stage 415. The protrusion 413 may be provided in a peripheral area of the rotating plate 412. A shaft connected to the stepping motor 414 may make contact with one side of the protrusion 413. The other side of the protrusion 413 (the side on the opposite side as the stepping motor 414) may be biased by a plunger pin or the like. According to this configuration, the protrusion 413 can be pushed and pulled by driving the stepping motor 414. This makes it possible to rotate the optical path tuning prism 411.

Likewise, the optical path tuning unit 420 may include an optical path tuning prism 421, a rotating plate 422, a protrusion 423, a stepping motor 424, and a stage 425. The optical path tuning prism 421 may be anchored upon the rotating plate 422. The rotating plate 422 may be held in a rotatable state on the stage 425. The protrusion 423 may be provided in a peripheral area of the rotating plate 422. A shaft connected to the stepping motor 424 may make contact with one side of the protrusion 423. The other side of the protrusion 423 (the side on the opposite side as the stepping motor 424) may be biased by a plunger pin or the like. According to this configuration, the protrusion 423 can be pushed and pulled by driving the stepping motor 424. This makes it possible to rotate the optical path tuning prism 421.

The beam width of the laser beam L1 that passes through the beam width tuning unit 22E may change in accordance with the magnification rate, which is dependent on the angles of the optical path tuning prisms 411 and 421 relative to the optical axis. The optical path tuning unit 420 on the rear edge side may tune the optical axis of the laser beam L1 so that the optical axis of the laser beam L1 that has shifted away from the original optical axis due to the optical path tuning unit 410 on the front edge side becomes an optical axis parallel to the original optical axis. The stepping motors 414 and 424 may rotate the rotating plates 412 and 422 under the control of the controller 10.

3.8 Third Variation on Oscillation Stage (Master Oscillator)

Figure 24:
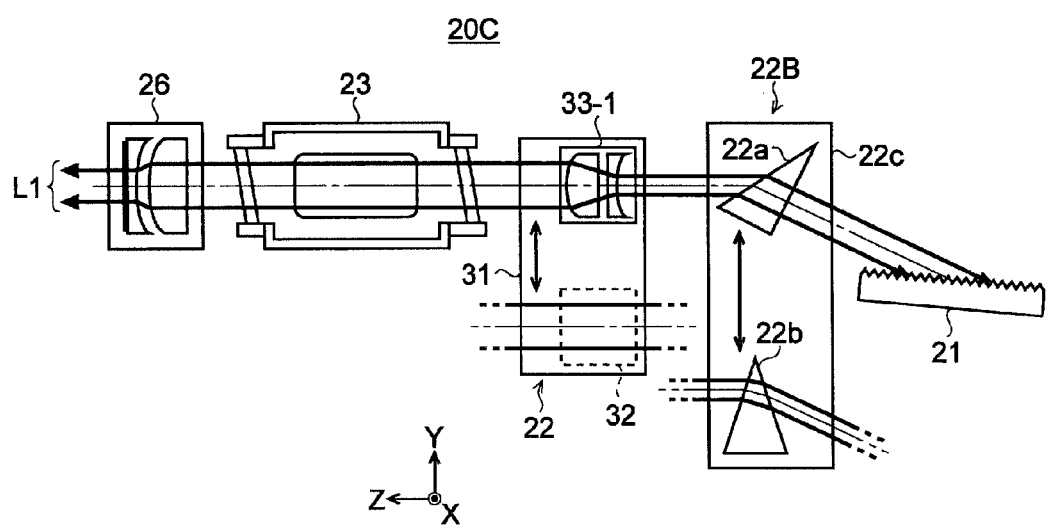
FIG. 24 schematically illustrates an example of the configuration of a master oscillator system according to a third variation.

FIG. 24 schematically illustrates an example of the configuration of a master oscillator system 20C according to a third variation. As shown in FIG. 24, the master oscillator system 20C may include a plurality of beam width tuning units 22 and 22B. Although FIG. 24 illustrates a master oscillator system 20C including beam width tuning units 22 and 22B having different configurations, the master oscillator system is not limited thereto. In other words, the aforementioned beam width tuning units may be used in combination with each other as appropriate.

3.9 Exemplary Configuration of Wavefront Tuning Unit

Next, examples of the configuration of a wavefront tuning unit will be described in detail using the drawings.

3.9.1 First Example

Figure 25:
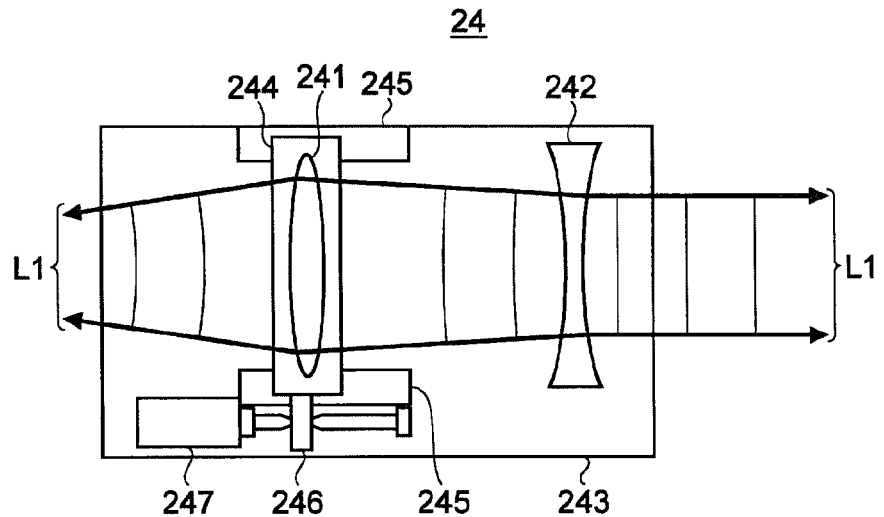
FIG. 25 schematically illustrates an example of the configuration of a wavefront tuning unit illustrated in FIG. 1.
Figure 26:
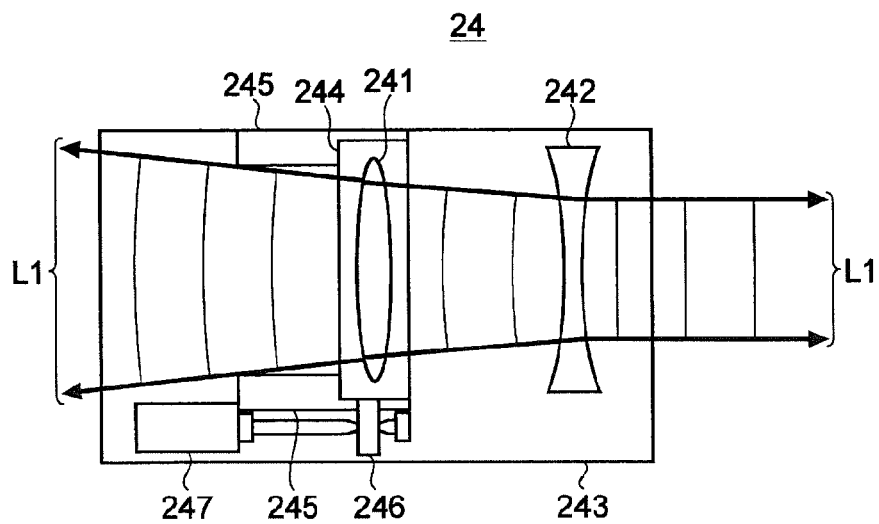
FIG. 26 illustrates another state of a wavefront tuning unit illustrated in FIG. 25.

FIGS. 25 and 26 schematically illustrate an example of the configuration of the wavefront tuning unit 24. The wavefront tuning unit 24 may include a concave cylindrical lens 242 in which both surfaces are recessed in a semicylindrical shape, a convex cylindrical lens 241 in which both surfaces protrude in a semicylindrical shape, and a frame 243. The concave cylindrical lens 242 or the convex cylindrical lens 241 may be provided with a movement mechanism that moves that lens along the optical axis of the laser beam L1. In the present descriptions, a case where the convex cylindrical lens 241 is provided with the movement mechanism is illustrated as an example. The concave cylindrical lens 242 that is not provided with a movement mechanism may be anchored to the frame 243.

The movement mechanism may include, for example, a moving stage 244, a slide rail 245, a protruding portion 246, and a stepping motor 247. The convex cylindrical lens 241 may be anchored to the moving stage 244. The slide rail 245 may be anchored to the frame 243 so as to extend along the optical path of the laser beam L1. The moving stage 244 may be mounted upon the slide rail 245 so as to be capable of sliding. The protruding portion 246 may protrude from the moving stage 244. The stepping motor 247 may cause the protruding portion 246 to advance/recede along the direction in which the slide rail 245 extends. Through this, the convex cylindrical lens 241 upon the moving stage 244 may move along the optical path of the laser beam 11. As a result, the distance between the convex cylindrical lens 241 and the concave cylindrical lens 242 may be adjusted.

As shown in FIGS. 25 and 26, the wavefront tuning unit 24 configured as described above can tune the wavefront of the laser beam L1 by adjusting the distance between the concave cylindrical lens 242 and the convex cylindrical lens 241.

3.9.2 Second Example (when Doubling as Output Coupling Mirror)

Figure 27:
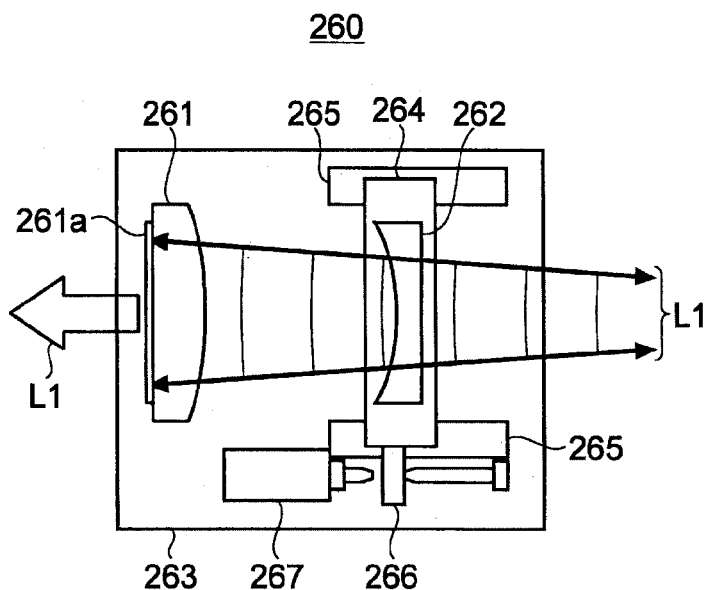
FIG. 27 schematically illustrates another example of the configuration of the wavefront tuning unit illustrated in FIG. 1.
Figure 28:
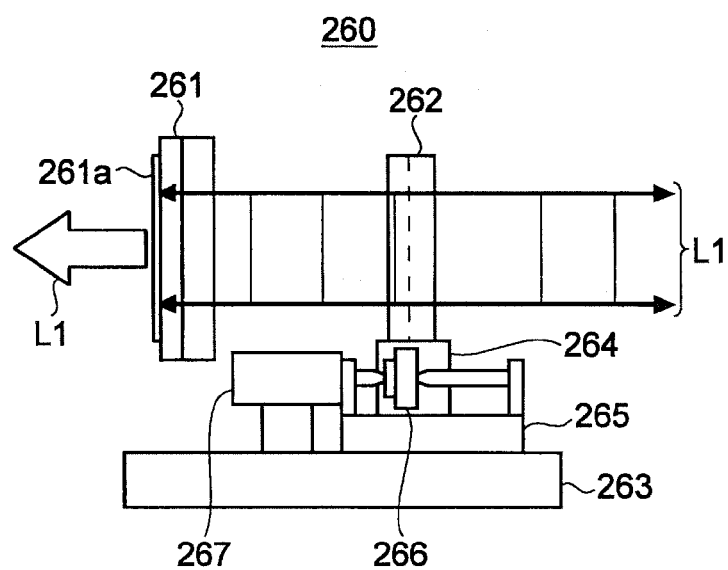
FIG. 28 is a side view illustrating a wavefront tuning unit illustrated in FIG. 27.

In addition, as mentioned earlier, the wavefront tuning unit 24 and the output coupling mirror 25 may be replaced with a wavefront tuning unit 260 provided with the functions of both of those elements. FIGS. 27 and 28 schematically illustrate an example of the configuration of the wavefront tuning unit 260. FIG. 27 is a top view of the wavefront tuning unit 260. FIG. 28 is a side view of the wavefront tuning unit 260.

The wavefront tuning unit 260 may include a convex cylindrical lens 261 whose one surface protrudes in a semicylindrical shape, a concave cylindrical lens 262 whose one surface is recessed in a semicylindrical shape, and a frame 263. The concave cylindrical lens 262 may be provided with a movement mechanism that moves that lens along the optical axis of the laser beam L1. The convex cylindrical lens 261 may be anchored to the frame 263. The surface of the convex cylindrical lens 261 on the opposite side of the curved surface may be provided with a partially-reflective coating 261a. The surface on which the partially-reflective coating 261a is formed may function as a laser output end of the master oscillator system 20.

The movement mechanism may include, for example, a moving stage 264, a slide rail 265, a protruding portion 266, and a stepping motor 267. The concave cylindrical lens 262 may be anchored to the moving stage 264. The slide rail 265 may be anchored to the frame 263 so as to extend along the optical path of the laser beam L1. The moving stage 264 may be mounted upon the slide rail 265 so as to be capable of sliding. The protruding portion 266 may protrude from the moving stage 264. The stepping motor 267 may cause the protruding portion 266 to advance/recede along the direction in which the slide rail 265 extends. Through this, the concave cylindrical lens 262 upon the moving stage 264 may move along the optical path of the laser beam L1. As a result, the distance between the concave cylindrical lens 262 and the convex cylindrical lens 261 may be adjusted.

As shown in FIGS. 27 and 28, the wavefront tuning unit 260 configured as described above can tune the wavefront of the laser beam L1 by adjusting the distance between the convex cylindrical lens 261 and the concave cylindrical lens 262.

3.10 Example of Disposition of Wavefront Tuning Unit

Next, the disposition of the wavefront tuning unit will be described according to the examples given hereinafter.

3.10.1 First Example (when Disposed within Resonator (Number 1))

Figure 29:
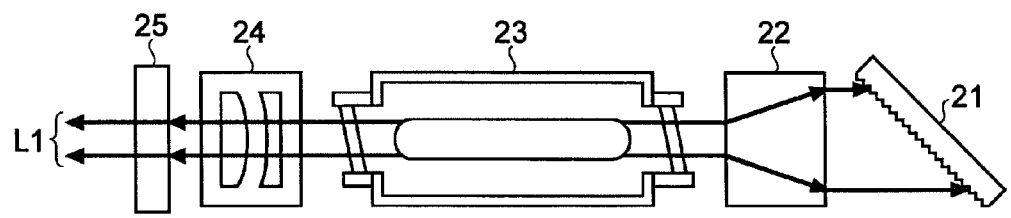
FIG. 29 illustrates an example of a master oscillator system in which a wavefront tuning unit and an output coupling mirror are separate entities according to an embodiment.

FIG. 29 illustrates an example of a master oscillator system 20 in which a wavefront tuning unit and an output coupling mirror are separate entities. The wavefront tuning unit 24 may be disposed in the optical path between the output coupling mirror 25 and the amplifier 23, as in a master oscillator system 20D shown in FIG. 29.

3.10.2 Second Example (when Disposed within Resonator (Number 2))

Figure 30:
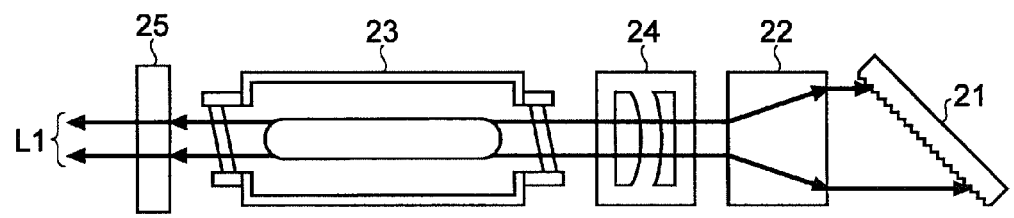
FIG. 30 illustrates another example of a master oscillator system in which a wavefront tuning unit and an output coupling mirror are separate entities according to an embodiment.

FIG. 30 illustrates another example of a master oscillator system 20 in which a wavefront tuning unit and an output coupling mirror are separate entities. The wavefront tuning unit 24 may be disposed in the optical path between the amplifier 23 and the beam width tuning unit 22, as in a master oscillator system 20E shown in FIG. 30.

3.10.3 Third Example (when Doubling as Resonator Mirror (Number 1))

Figure 31:
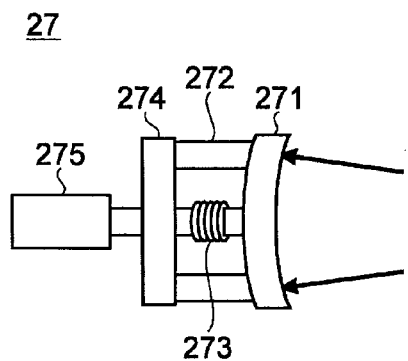
FIG. 31 illustrates an example of a reflective-type wavefront tuning unit according to an embodiment.
Figure 32:
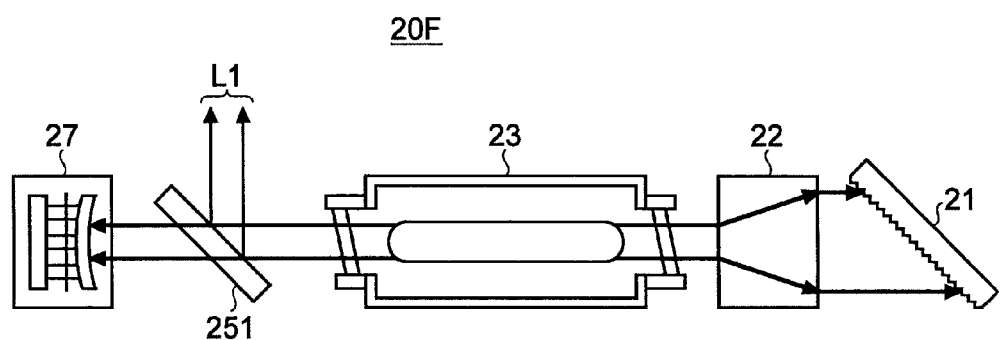
FIG. 32 illustrates an example of a master oscillator system that employs a wavefront tuning unit illustrated in FIG. 31.

In addition, it is also possible to use a reflective-type wavefront tuning unit. FIG. 31 illustrates an example of a reflective-type wavefront tuning unit. FIG. 32 illustrates an example of a master oscillator system 20 that employs the wavefront tuning unit illustrated in FIG. 31. As shown in FIG. 31, a reflective-type wavefront tuning unit 27 may be what is known as a deformable mirror, in which the curvature factor of the mirror surface can be adjusted. The wavefront tuning unit 27 may include a mirror 271, rods 272, a spring 273, a plate 274, and a stepping motor 275. The mirror 271 may have, for example, a rectangular or square mirror surface. The rods 272 may support two opposing sides of the mirror 271, on the rear surface thereof, on the plate 274. One end of the spring 273 may be attached to one or more points upon the approximate center line in the rear surface of the mirror 271. The other end of the spring 273 may be connected to the stepping motor 275. The stepping motor 275 may push and pull the rear surface of the mirror 271 via the spring 273. Through this, the mirror surface of the mirror 271 can curve in an arc shape, which makes it possible to change the curvature factor of the mirror 271.

This reflective-type wavefront tuning unit 27 may function as one resonator mirror in an optical resonator of a master oscillator system 20F. Note that the other resonator mirror may be the grating 21. In this case, the wavefront tuning unit 27 can be disposed at one end of the optical resonator, as shown in FIG. 32.

Meanwhile, as shown in FIG. 32, the master oscillator system 20F may include a beam splitter 251. The beam splitter 251 may function as the laser output end of the master oscillator system 20F. The beam splitter 251 may, for example, be disposed in the optical path between the wavefront tuning unit 27 and amplifier 23.

3.10.4 Fourth Example (when Doubling as Resonator Mirror (Number 2))

Figure 33:
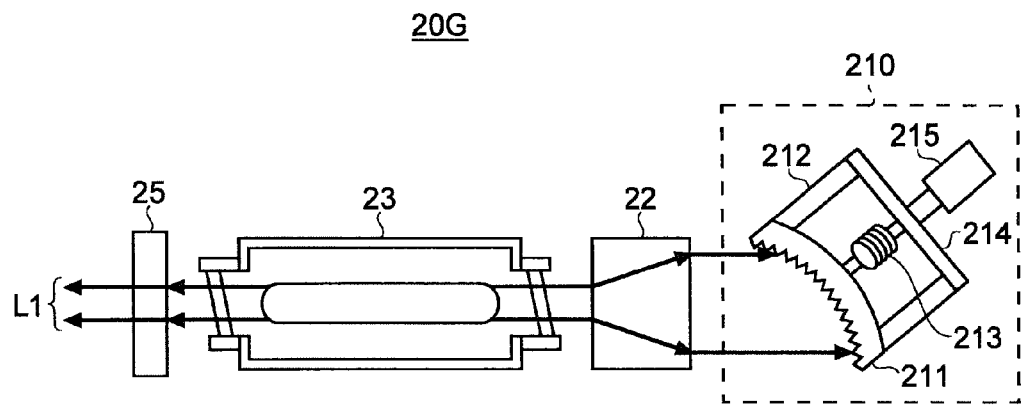
FIG. 33 schematically illustrates an example of the configuration of a master oscillator system that employs a grating having a wavefront tuning function according to an embodiment.

In addition, the grating 21 may be replaced with a grating provided with a wavefront tuning function. In this case, the wavefront tuning unit 24 may be omitted. FIG. 33 schematically illustrates an example of the configuration of a master oscillator system 20G that employs a grating having a wavefront tuning function.

As shown in FIG. 33, the master oscillator system 20G may include a wavefront tuning grating 210 instead of the wavefront tuning unit 24 and the grating 21. The wavefront tuning grating 210 may include a grating 211, rods 212, a spring 213, a plate 214, and a stepping motor 215. The grating 211 may be configured as a deformable mirror on the optical surface of which a grating is formed. The grating 211 may function as one resonator mirror in an optical resonator. The rods 212 may support two sides of the grating 211 that are perpendicular to the grooves thereof, on the rear surface of the grating 211, on the plate 214. One end of the spring 213 may be attached to one or more points upon the approximate center line in the rear surface of the grating 211. The other end of the spring 213 may be connected to the stepping motor 215. The stepping motor 215 may push and pull the rear surface of the grating 211 via the spring 213. Through this, the refractive surface of the grating 211 can curve in an arc shape, which makes it possible to change the curvature factor of the grating 211.

3.11 Oscillation Stage (Master Oscillator) in which Wavefront Tuning Unit can be Switched Like the aforementioned beam width tuning unit, the wavefront tuning unit incorporated into the master oscillator may be capable of being inserted into or removed from the optical path of the laser beam L1 within the optical resonator. Several examples of this will be described hereinafter using the drawings. Although the following descriptions use the master oscillator system 20D shown in FIG. 29 as a basis, it should be noted that the master oscillator system is not limited thereto. In other words, any of the aforementioned master oscillator systems may be used as a basis, and in such a case, a wavefront tuning unit capable of switching the wavefront may be used in combination with a beam width tuning unit capable of switching the magnification rate.

Figure 34:
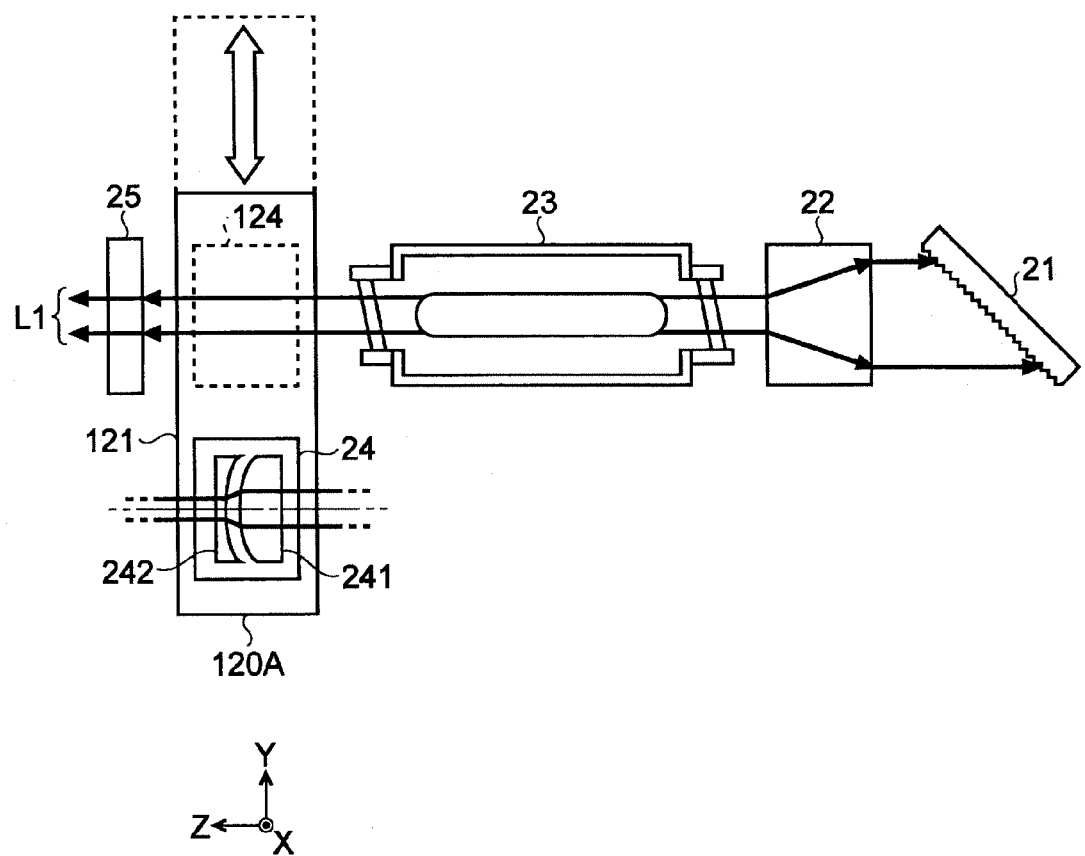
FIG. 34 schematically illustrates an example of the configuration of a master oscillator system in which an output coupling mirror and a wavefront tuning unit are separate entities.

3.11.1 When Output Coupling Mirror and Wavefront Tuning Unit are Separate Entities FIG. 34 schematically illustrates an example of the configuration of a master oscillator system 20H in which an output coupling mirror and a wavefront tuning unit are separate entities. As shown in FIG. 34, the master oscillator system 20H may include a wavefront switching module 120A. The wavefront switching module 120A may include a moving stage 121 and the wavefront tuning unit 24. The wavefront tuning unit 24 may be configured in the same manner as the aforementioned wavefront tuning unit 24. Alternatively, the wavefront tuning unit 24 may be configured using a single long-focus spherical lens. In such a case, it is preferable for the spherical lens to be a cylindrical lens.

The wavefront tuning unit 24 may be anchored upon the moving stage 121. The number of wavefront tuning units is not limited to one. In other words, the wavefront switching module 120A may include a plurality of wavefront tuning units. In this case, the tuned wavefronts by each wavefront tuning unit may be different. In addition, the wavefront switching module 120A may include a space 124 in which a wavefront tuning unit is not provided.

The moving stage 121 may move, due to a movement mechanism (not shown), in the Y direction or X direction that is respectively perpendicular to the optical path of the laser beam L1. Through this, one of the wavefront tuning unit 24 and the space 124 may be selectively disposed within the optical path of the laser beam L1. As a result, the wavefront of the laser beam L1 can be tuned to one of the wavefronts set in the wavefront tuning unit 24 and the space 124. Note that the space 124 may not perform wavefront tuning.

3.11.2 When Wavefront Tuning Unit Doubles as Output Coupling Mirror

Figure 35:
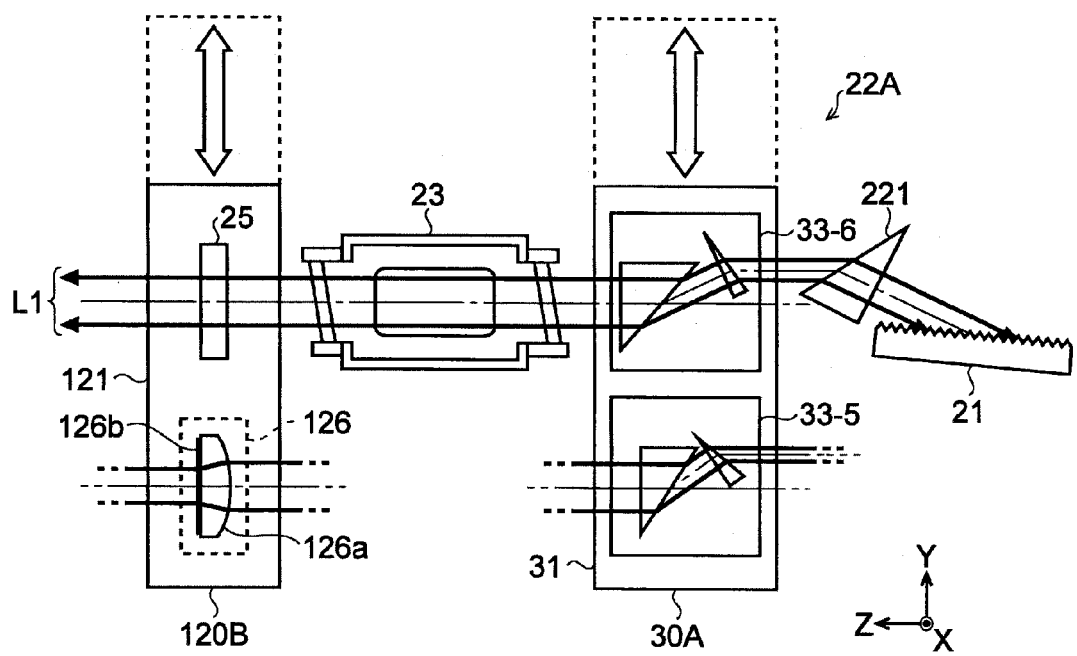
FIG. 35 schematically illustrates an example of the configuration of a master oscillator system including a wavefront tuning unit that doubles as an output coupling mirror.

Meanwhile, FIG. 35 schematically illustrates an example of the configuration of a master oscillator system 20J including a wavefront tuning unit that doubles as an output coupling mirror. As shown in FIG. 35, the master oscillator system 20J may include a wavefront switching module 120B. The wavefront switching module 120B may include the moving stage 121, the output coupling mirror 25, and a wavefront tuning unit 126 that doubles as an output coupling mirror. The output coupling mirror 25 and the wavefront tuning unit 126 may be anchored upon the moving stage 121.

The wavefront tuning unit 126 may include a cylindrical lens 126a. However, the wavefront tuning unit is not limited to the cylindrical lens 126a, and can be replaced with any optical element capable of changing the wavefront. The curved surface of the cylindrical lens 126a may be anchored to the moving stage 121 so as to face toward the rear edge side. The curved surface of the cylindrical lens 126a may be provided with a low-reflection coating. The flat surface of the cylindrical lens 126a on the opposite side of the curved surface may be provided with a partially-reflective coating 126b. The flat surface on which the partially-reflective coating 126b is formed may function as a laser output end of the master oscillator system 20J. Note that the number of wavefront tuning units 126 is not limited to one. In other words, the wavefront switching module 120B may include a plurality of wavefront tuning units that each double as an output coupling mirror. In this case, the tuned wavefronts by each wavefront tuning unit may be different.

The moving stage 121 may move, due to a movement mechanism (not shown), in the Y direction or X direction that is respectively perpendicular to the optical path of the laser beam L1. Through this, one of the wavefront tuning unit 126 and the output coupling mirror 25 may be selectively disposed within the optical path of the laser beam L1. As a result, the wavefront of the laser beam L1 can be tuned to one of the wavefronts set in the wavefront tuning unit 126 and the output coupling mirror 25. Note that the output coupling mirror 25 may not perform wavefront tuning.

3.12 Flowcharts

Next, operations of a laser apparatus according to an embodiment will be described in detail with reference to the drawings. Although operations performed by the laser apparatus 100 illustrated in FIG. 1 will be described hereinafter as an example, the operations can also be applied in other laser apparatuses. Moreover, the following describes operations performed by the controller 10 as operations performed by the laser apparatus.

3.12.1 First Example

Figure 36:
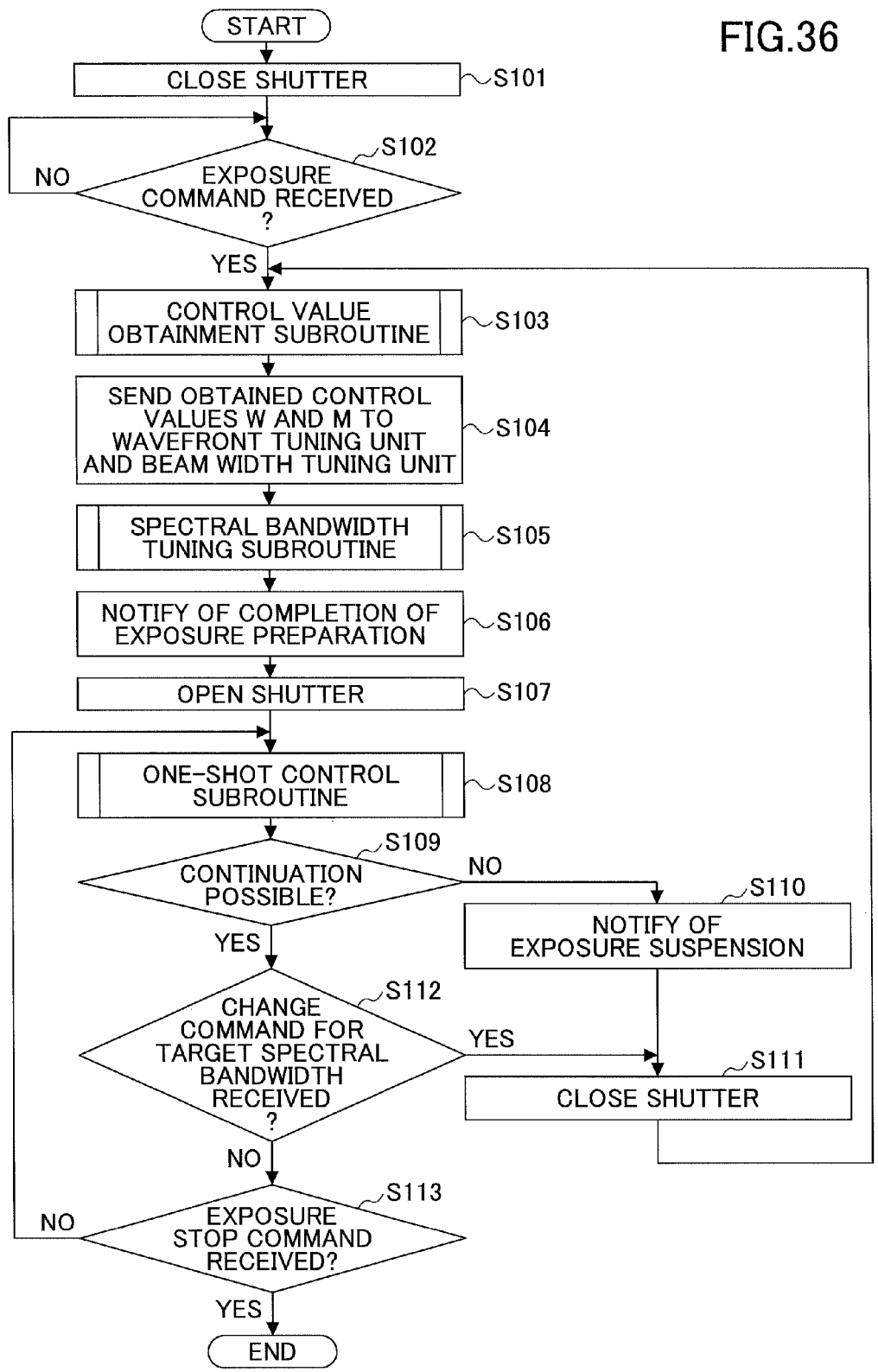
FIG. 36 is a flowchart illustrating an example of a laser output control operation according to an embodiment.
Figure 37:
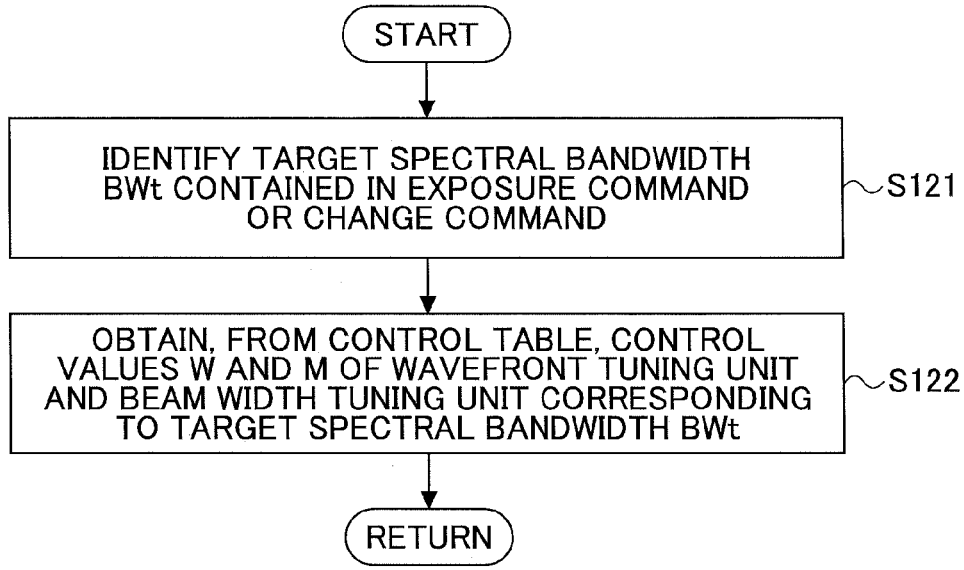
FIG. 37 is a flowchart illustrating an example of a control value obtainment subroutine indicated in step S103 of FIG. 36.
Figure 38:
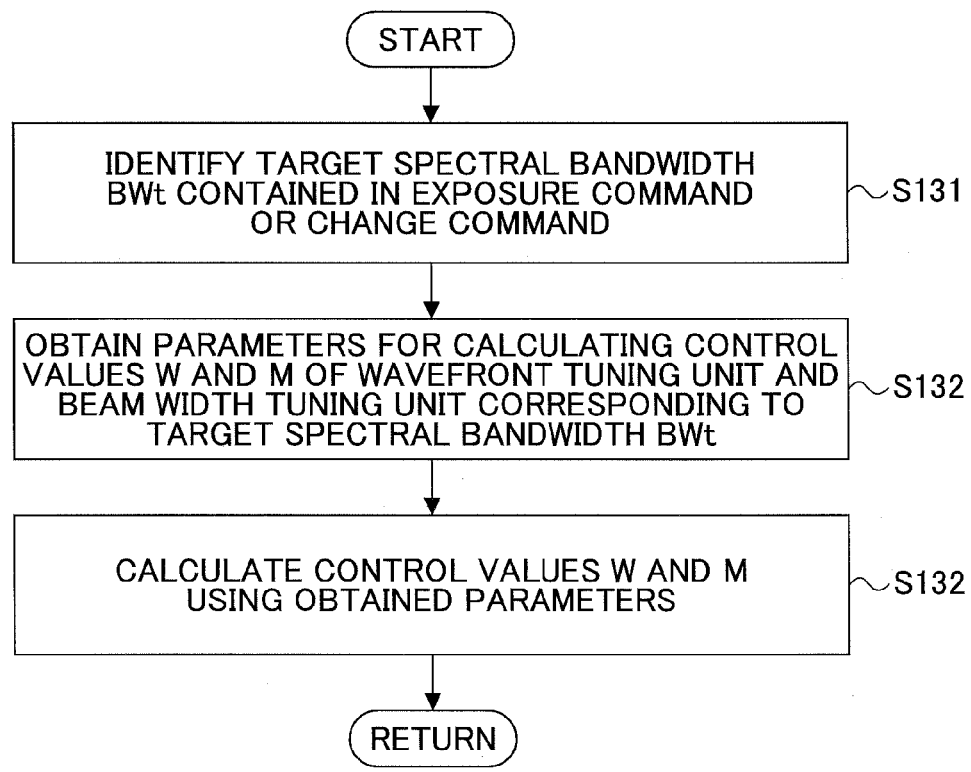
FIG. 38 is a flowchart illustrating another example of the control value obtainment subroutine indicated in step S103 of FIG. 36.
Figure 39:
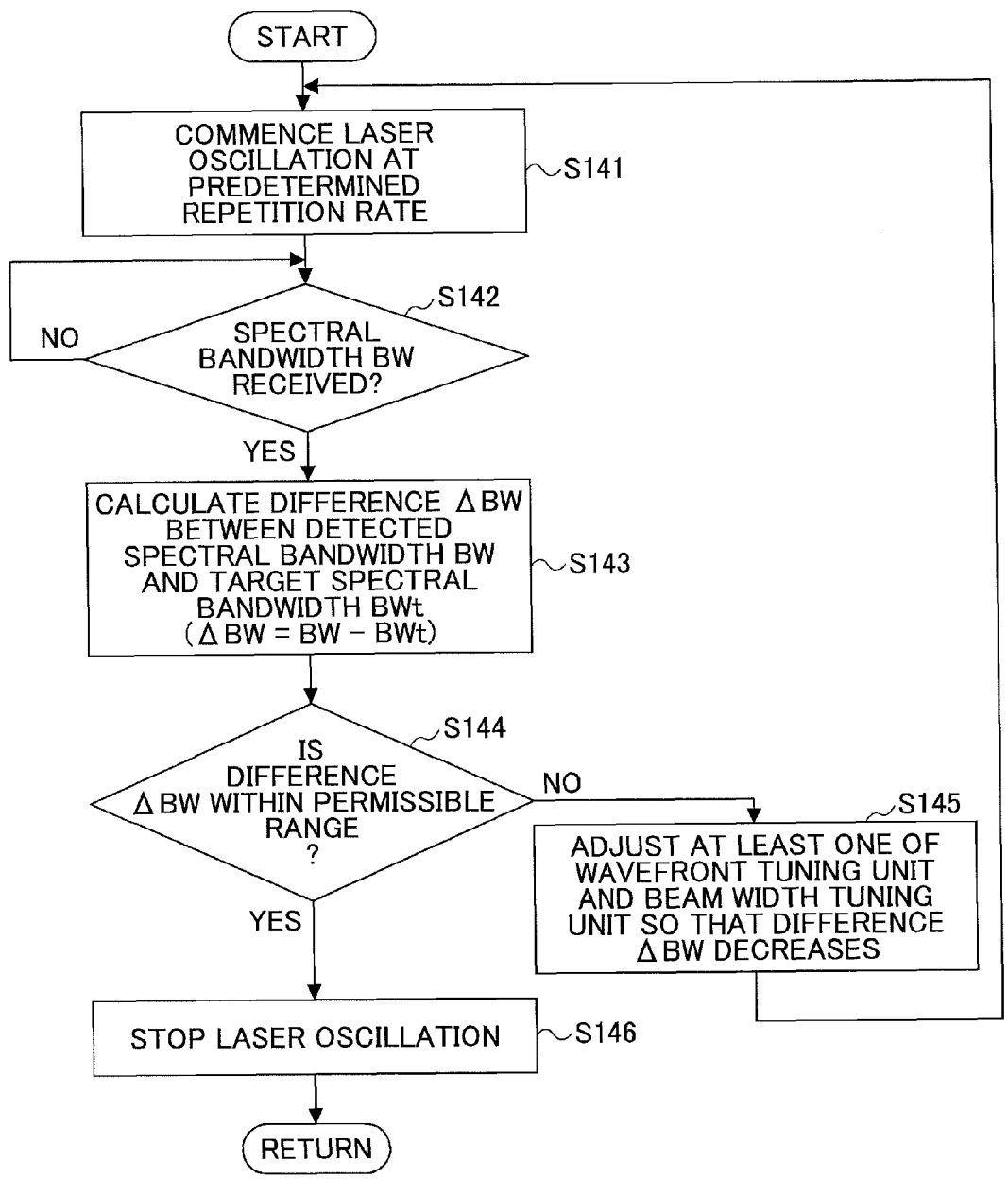
FIG. 39 is a flowchart illustrating an example of a spectral bandwidth tuning subroutine indicated in step S105 of FIG. 36.
Figure 40:
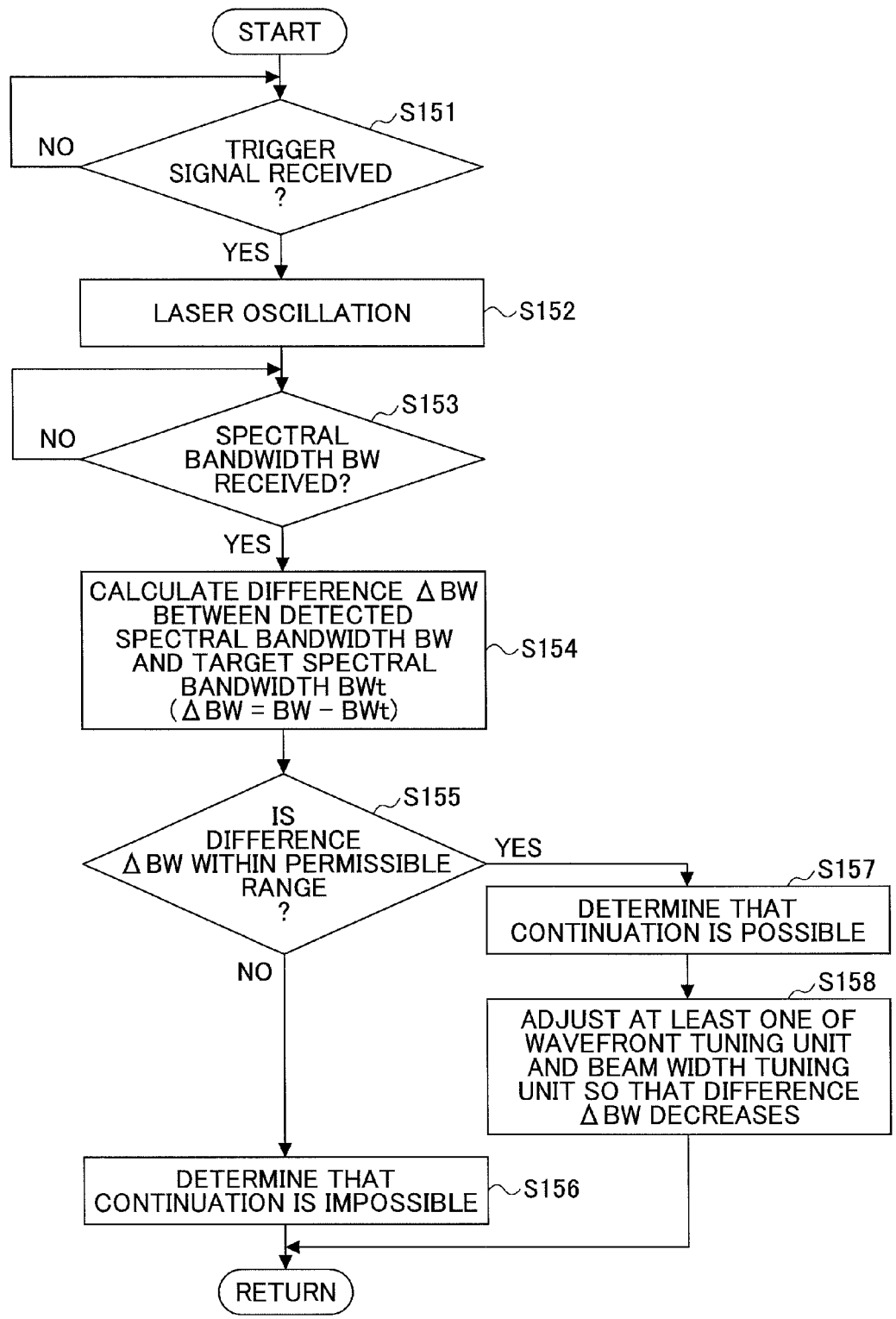
FIG. 40 is a flowchart illustrating an example of a one-shot control subroutine indicated in step S108 of FIG. 36.

First, an operation flow in the case where the controller 10 controls the wavefront tuning unit 24 and the beam width tuning unit 22 based on the control table stored in the storage unit 11 will be described in detail with reference to the drawings. FIG. 36 is a flowchart illustrating an example of a laser output control operation executed by the controller 10. FIG. 37 is a flowchart illustrating an example of a control value obtainment subroutine indicated in step S103 of FIG. 36. FIG. 38 is a flowchart illustrating another example of the control value obtainment subroutine indicated in step S103 of FIG. 36. FIG. 39 is a flowchart illustrating an example of a spectral bandwidth tuning subroutine indicated in step S105 of FIG. 36. FIG. 40 is a flowchart illustrating an example of a one-shot control subroutine indicated in step S108 of FIG. 36.

3.12.1.1 Laser Output Control Operation (Main Flow)

As shown in FIG. 36, the controller 10 may, after startup, control the shutter mechanism 70 so as to block the optical path of the laser beam L1 that leads to the exposure device 80 (step S101). Next, the controller 10 may stand by until an exposure command is received from an external device such as the controller 81 provided in the exposure device 80 (step S102; NO). When the exposure command is received (step S102; YES), the controller 10 may execute the control value obtainment subroutine (step S103). In the control value obtainment subroutine, the control values W and M, for controlling the wavefront tuning unit 24 and the beam width tuning unit 22 to achieve the target spectral bandwidth BWt contained in the exposure command, may be obtained.

Next, the controller 10 may send the obtained control values W and M to the wavefront tuning unit 24 and the beam width tuning unit 22 (step S104). Through this, the master oscillator system 20 may make preparations for laser oscillation in the vicinity of the target spectral bandwidth BWt.

Next, the controller 10 may execute the spectral bandwidth tuning subroutine that brings the spectral bandwidth BW of the laser beam L1 outputted from the master oscillator system 20 closer to the target spectral bandwidth BWt (step S105). When the adjustment of the laser beam L1 to the target spectral bandwidth BWt is complete, the controller 10 may then notify the controller 81, which is the source of the request, that exposure preparations have been completed (step S106).

Next, the controller 10 may control the shutter mechanism 70 so that the optical path of the laser beam L1 leading to the exposure device 80 is opened (step S107). Next, the controller 10 may execute the one-shot control subroutine that controls the spectral bandwidth BW of the laser beam L1 one pulse at a time (step S108). Note that in the one-shot control subroutine, it may be determined whether or not the exposure can be continued.

Next, the controller 10 may determine whether or not to continue the exposure (step S109). This determination may be carried out based on the result of determining whether or not exposure can be continued as executed in the one-shot control subroutine. In the case where the exposure cannot be continued (step S109; NO), the controller 10 may notify the controller 81, which is the source of the request, that the exposure is to be suspended (step S110). Next, the controller 10 may control the shutter mechanism 70 so as to block the optical path of the laser beam L1 that leads to the exposure device 80 (step S111). Thereafter, the controller 10 may return to step S103.

On the other hand, in the case where the exposure can be continued (step S109; YES), the controller 10 may determine whether or not a change command for changing the target spectral bandwidth BWt has been received from the external device such as the controller 81 of the exposure device 80 (step S112). In the case where the change command has been received (step S112; YES), the controller 10 may move to step S111.

However, in the case where the change command has not been received (step S112; NO), the controller 10 may determine whether or not an exposure stop command requesting the exposure to be stopped has been received (step S113). In the case where the exposure stop command has been received (step S113; YES), the controller 10 may end the laser output control operation. However, in the case where the exposure stop command has not been received (step S113; NO), the controller 10 may return to step S108.

3.12.1.2 Control Value Obtainment Subroutine

Next, the control value obtainment subroutine indicated in step S103 of FIG. 36 will be described.

3.12.1.2.1 First Example

As shown in FIG. 37, in the control value obtainment subroutine, the controller 10 may identify the target spectral bandwidth BWt contained in the exposure command or the change command (step S121). Note that the change command may contain the target spectral bandwidth BWt, and may contain the target spectral bandwidth BWt specified in a previous command or a change amount from the spectral bandwidth currently detected by the exposure device 80. Next, the controller 10 may obtain, from the control table in the storage unit 11, the control values W and M of the wavefront tuning unit 24 and the beam width tuning unit 22 that correspond to the identified target spectral bandwidth BWt (step S122). Thereafter, the controller 10 may return to the laser output control operation shown in FIG. 36.

3.12.1.2.2 Second Example

Alternatively, the control value obtainment subroutine may be an operation such as that described hereinafter. As shown in FIG. 38, in the control value obtainment subroutine, the controller 10 may specify the target spectral bandwidth BWt contained in the exposure command or the change command (step S131). Next, the controller 10 may obtain, from the control table in the storage unit 11, various types of parameters for calculating the control values W and M of the wavefront tuning unit 24 and the beam width tuning unit 22 from the obtained target spectral bandwidth BWt (step S132). Next, the controller 10 may calculate the control values W and M using the obtained parameters and the target spectral bandwidth BWt (step S133). Thereafter, the controller 10 may return to the laser output control operation shown in FIG. 36.

3.12.1.3 Spectral Bandwidth Tuning Subroutine

Next, the spectral bandwidth tuning subroutine indicated in step S105 of FIG. 36 will be described. As shown in FIG. 39, in the spectral bandwidth tuning subroutine, the controller 10 may first cause the master oscillator system 20 to commence laser oscillation for outputting the laser beam L1 at a predetermined repetition rate (step S141). At this time, the controller 10 may drive the amplifying apparatus 50 to a pumped state in synchronization with laser oscillation performed by the master oscillator system 20. As a result, the laser beam L1 may be amplified. Next, the controller 10 may stand by until the spectral bandwidth BW of the laser beam L1 is received from the spectral detection unit 60 (step S142; NO). When the spectral bandwidth BW is received (step S142; YES), the controller 10 may calculate a difference ΔBW between the detected spectral bandwidth BW and the target spectral bandwidth BWt (step S143).

Next, the controller 10 may determine whether or not the calculated difference ΔBW is within a permissible range (step S144). In this determination, it may be determined whether or not the difference ΔBW is within the permissible range based an a comparison as to whether or not the absolute value of the difference ΔBW is equal to or less than a threshold ΔBWr. The threshold ΔBWr may be saved in advance in a memory or the like (not shown), or may be contained in the exposure command, the change command, or the like. In the case where the difference ΔBW is not within the permissible range (step S144; NO), the controller 10 may adjust at least one of the wavefront tuning unit 24 and the beam width tuning unit 22 so that the difference ΔBW decreases (step S145). Note that the control amounts W and M supplied to the wavefront tuning unit 24 and the beam width tuning unit 22 may be calculated each time by the controller 10 based on the calculated difference ΔBW, or may be associated with the difference ΔBW in the control table in advance. Alternatively, a control amount W and/or M having a predetermined value may be supplied to at least one of the wavefront tuning unit 24 and the beam width tuning unit 22 in accordance with the sign of the difference ΔBW. Thereafter, the controller 10 may return to step S141.

On the other hand, in the case where the difference ΔBW is within the permissible range (step S144; YES), the controller 10 may stop the laser oscillation performed by the master oscillator system 20 (step S146). At this time, the controller 10 may stop the driving of the amplifying apparatus 50. Thereafter, the controller 10 may return to the laser output control operation shown in FIG. 36.

By executing the above spectral bandwidth tuning subroutine, the spectral bandwidth BW of the laser beam L1 can be adjusted so as to fall within the permissible range for the target spectral bandwidth BWt.

3.12.1.4 One-Shot Control Subroutine

Next, the one-shot control subroutine indicated in step S108 of FIG. 36 will be described. As shown in FIG. 40, in the one-shot control subroutine, the controller 10 may first stand by until a trigger signal specifying the timing of laser oscillation is received (step S151; NO). This trigger signal may be sent, for example, from the external device such as the controller 81 of the exposure device 80. Alternatively, a clock signal generated by a clock generator (not shown), or a signal obtained by dividing that clock signal, may be used as the trigger signal.

When the trigger signal is received (step S151; YES), the controller 10 may execute laser oscillation that oscillates one pulse of the laser beam L1 (step S152). Next, the controller 10 may stand by until the spectral bandwidth BW of the laser beam L1 is received from the spectral detection unit 60 (step S153; NO). When the spectral bandwidth 3W is received (step S153; YES), the controller 10 may calculate the difference ΔBW between the detected spectral bandwidth BW and the target spectral bandwidth BWt (step S154). Next, the controller 10 may determine whether or not the calculated difference ΔBW is within the permissible range (step S155). In this determination, it may be determined whether or not the absolute value of the difference ΔBW is equal to or less than the threshold ΔBWr. The threshold ΔBWr may be saved in advance in a memory or the like (not shown), or may be contained in the exposure command, the change command, or the like.

In the case where the difference ΔBW is not within the permissible range (step S155; NO), the controller 10 may determine that laser output cannot be continued (step S156). Thereafter, the controller 10 may return to the laser output control operation shown in FIG. 36. On the other hand, in the case where the difference ΔBW is within the permissible range (step S155; YES), the controller 10 may determine that laser output can be continued (step S157). Next, the controller 10 may adjust at least one of the wavefront tuning unit 24 and the beam width tuning unit 22 so that the difference ΔBW decreases further (step S158). Note that the control amounts W and M supplied to the wavefront tuning unit 24 and the beam width tuning unit 22 may be calculated each time by the controller 10 based on the calculated difference ΔBW, or may be associated with the difference ΔBW in the control table in advance. Alternatively, a control amount W and/or M having a predetermined value may be supplied to at least one of the wavefront tuning unit 24 and the beam width tuning unit 22 in accordance with the sign of the difference ΔBW. Thereafter, the controller 10 may return to the laser output control operation shown in FIG. 36.

By executing the one-shot control subroutine described above, the spectral bandwidth BW of the laser beam L1 can be controlled one pulse at a time. Furthermore, because at least one of the wavefront tuning unit 24 and the beam width tuning unit 22 can be adjusted for each single-pulse oscillation, the laser beam L1 can be outputted with a more stable spectral bandwidth BW.

This embodiment describes a case where one-shot control is carried out. However, the disclosure is not limited to this embodiment, and the spectral bandwidths BW of a plurality of laser pulses may be averaged, and the various determinations, the control of the wavefront tuning unit 24 and the beam width tuning unit 22, and so on may then be executed based on the obtained average value.

3.12.2 Second Example

Figure 41:
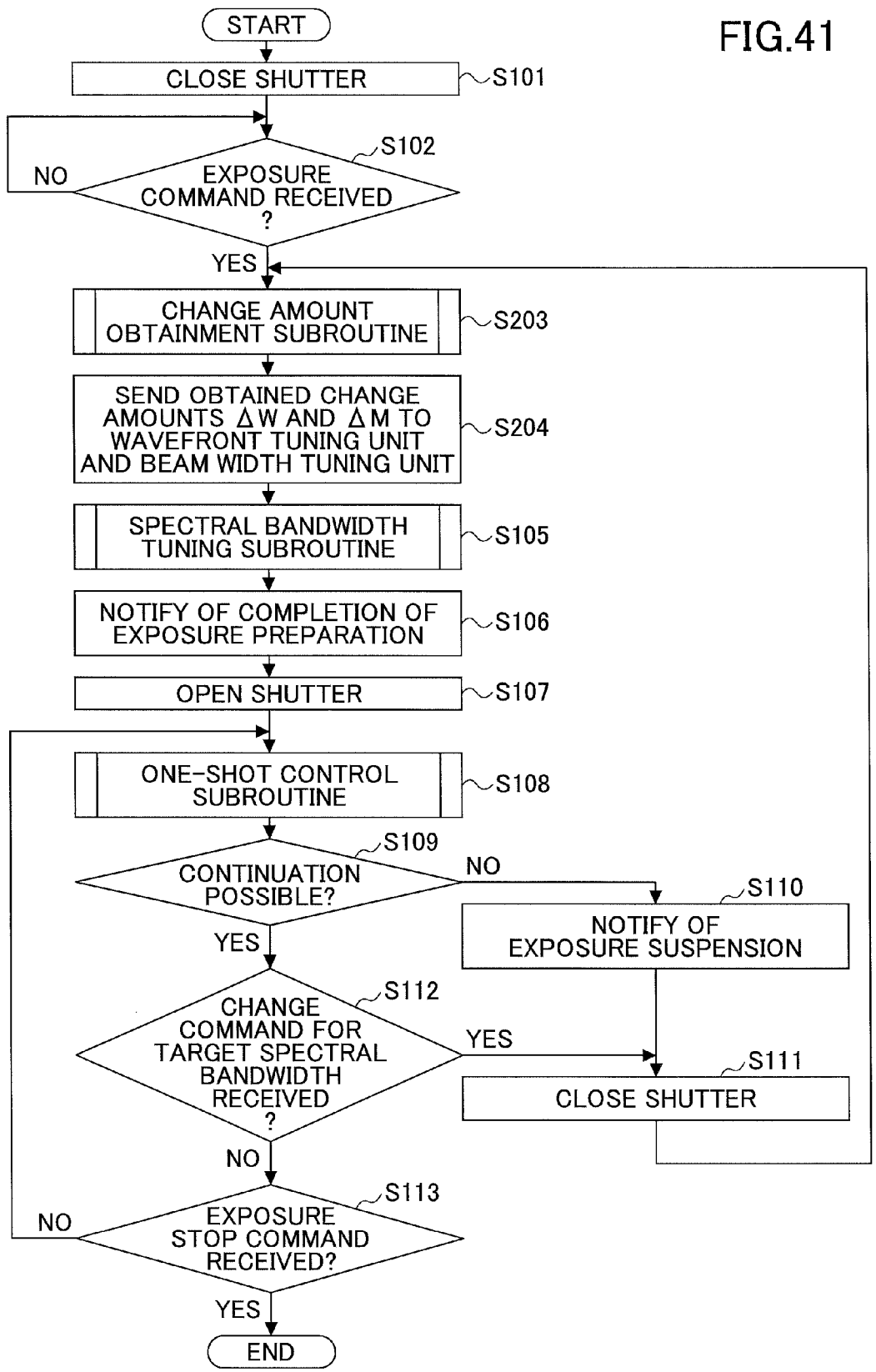
FIG. 41 is a flowchart illustrating another example of a laser output control operation according to an embodiment.
Figure 42:
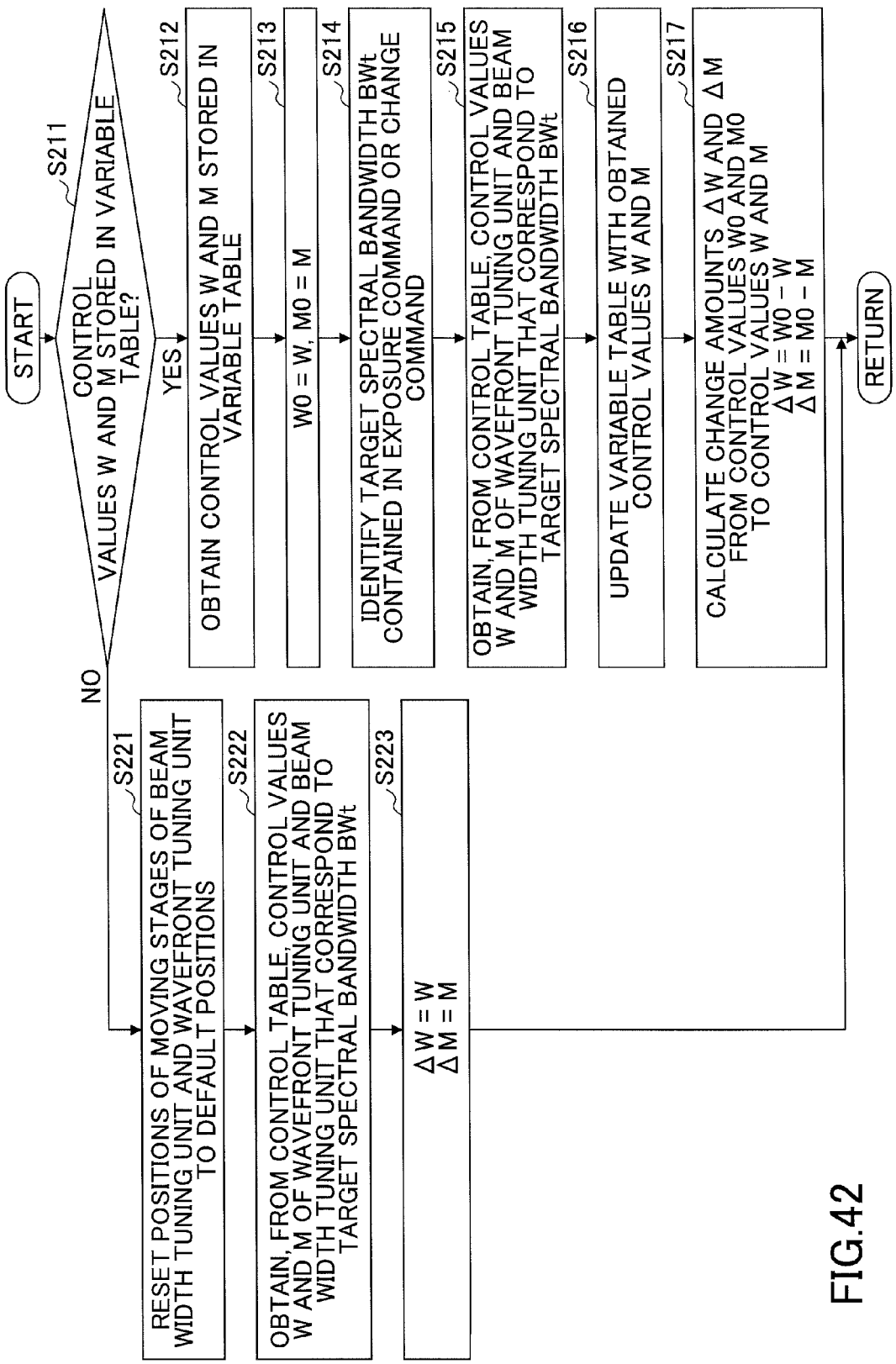
FIG. 42 is a flowchart illustrating an example of a change amount obtainment subroutine indicated in step S203 of FIG. 41.
Figure 43:
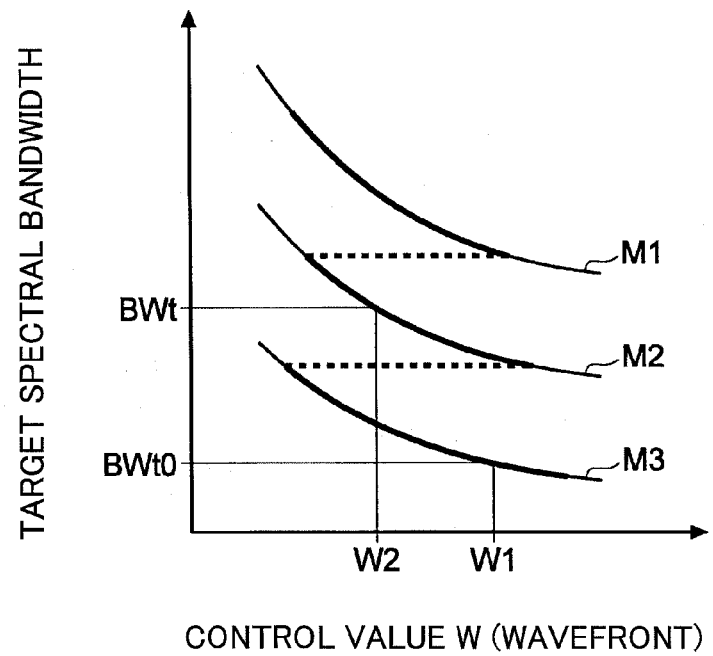
FIG. 43 is a diagram illustrating the calculation of change amounts ΔW and ΔM from a change in a target spectral bandwidth BWt in the flowchart illustrated in FIG. 42.
Figure 44:
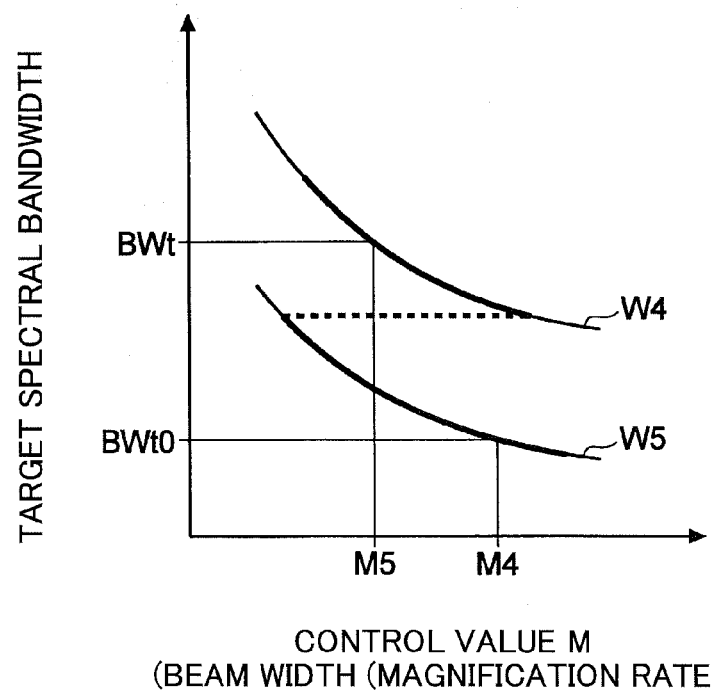
FIG. 44 is a diagram illustrating the calculation of the change amounts ΔW and ΔM from a change in the target spectral bandwidth BWt in the case where a wavefront tuning unit can be switched.

In addition, it is also possible for the controller 10 to operate so as to tune the spectral bandwidth BW in accordance with a change amount from the current spectral bandwidth BW. FIG. 41 is a flowchart illustrating another example of a laser output control operation executed by the controller 10. FIG. 42 is a flowchart illustrating an example of a change amount obtainment subroutine indicated in step S203 of FIG. 41. FIG. 43 is a diagram illustrating a process for calculating change amounts ΔW and ΔM from a change in the target spectral bandwidth BWt. FIG. 44 is a diagram illustrating a process for calculating the change amounts ΔW and ΔM from a change in the target spectral bandwidth BWt in the case where a wavefront tuning unit can be switched. Note that the spectral bandwidth tuning subroutine indicated in step S105 of FIG. 41 and the one-shot control subroutine indicated in step S108 of FIG. 41 may be the same as those described above.

3.12.2.1 Laser Output Control Operation (Main Flow)

As shown in FIG. 41, the controller 10 may, after startup, control the shutter mechanism 70 so as to block the optical path of the laser beam L1 that leads to the exposure device 80 (step S101). Next, the controller 10 may standby until an exposure command is received from an external device such as the controller 81 provided in the exposure device 80 (step S102; NO). When the exposure command is received (step S102; YES), the controller 10 may execute the change amount obtainment subroutine (step S203). In the change amount obtainment subroutine, the controller 10 may obtain the change amounts ΔW and ΔM for changing the control values W and M of the wavefront tuning unit 24 and the beam width tuning unit 22 by a desired amount so that the spectral bandwidth BW of the laser beam L1 becomes the target spectral bandwidth BWt contained in the exposure command or the change command.

Next, the controller 10 may send the obtained change amounts ΔW and ΔM to the wavefront tuning unit 24 and the beam width tuning unit 22 (step S204). Through this, the master oscillator system 20 may make preparations for laser oscillation in the vicinity of the target spectral bandwidth BWt. Thereafter, the controller 10 may execute the same operations as the operations described using FIG. 36.

3.12.2.2 Change Amount Obtainment Subroutine

Next, the change amount obtainment subroutine indicated in step S203 of FIG. 41 will be described. As shown in FIG. 42, the controller 10 may first determine whether or not the previous instances of the control values W and M are stored in a variable table in the storage unit 11 (step S211). The variable table may hold values for the control values W and M in a rewritable state. It is preferable for the values for the control values W and M held in the variable table to correspond to values indicating the positions of the moving stages included in the beam width tuning unit and the wavefront tuning unit. In the case where the previous instances of the control values W and M are not stored in the variable table (step S211; NO), the controller 10 may return to the laser output control operation shown in FIG. 41. This case may include a case in which the variable table has been reset due to the device being restarted or the like, as shown in FIG. 42. At this time, the positions of the respective moving stages included in the beam width tuning unit and the wavefront tuning unit may be reset to their default positions in accordance with the variable table being reset (step S221). It is preferable to pre-set the default positions of the moving stages based on the ranges of movement of the respective moving stages. Then, the control values W and M to be supplied to the wavefront tuning unit 24 and the beam width tuning unit 22 may be obtained from the target spectral bandwidth BWt using the control table in the storage unit 11 (step S222). Having done so, the operation may return to the operation illustrated in FIG. 41, assuming that ΔW=W and ΔM=M, as indicated in step S223. On the other hand, in the case where the previous instances of the control values W and M are stored in the variable table (step S211; YES), the controller 10 may obtain those control values W and M (step S212). Next, the controller 10 may take the obtained control values W and M as a control value W0 and a control value M0, respectively (step S213).

Next, the controller 10 may identify the target spectral bandwidth BWt contained in the exposure command or the change command (step S214). Note that the change command may contain the target spectral bandwidth BWt, and may contain the target spectral bandwidth BWt specified in a previous command or a change amount from the spectral bandwidth currently detected by the exposure device 80. Next, the controller 10 may obtain, from the control table in the storage unit 11, the control values W and M of the wavefront tuning unit 24 and the beam width tuning unit 22 that correspond to the obtained target spectral bandwidth BWt (step S215). Next, the controller 10 may update the control values W and M in the variable table (step S216).

Next, the controller 10 may calculate the change amounts ΔW and ΔM from the previous instances of the control values W0 and M0 to the current instances of the control values W and M (step S217). Thereafter, the controller 10 may return to the laser output control operation shown in FIG. 36.

3.12.2.3 Change Amount Calculation Example

Here, a method for calculating the change amounts ΔW and ΔM indicated in step S217 of FIG. 42 will be described using the following example. The example shown in FIG. 43 indicates a case where the magnification rate of the beam width tuning unit 22 can be switched to any of three types (control values M1 through M3). In the example shown in FIG. 43, the control values W0 and M0 of the wavefront tuning unit 24 and the beam width tuning unit 22 corresponding to the previous target spectral bandwidth BWt0 are control values W1 and M3, respectively. In addition, the control values W and M of the wavefront tuning unit 24 and the beam width tuning unit 22 corresponding to the current target spectral bandwidth BWt are control values W2 and M2, respectively. In this case, the change amounts ΔW and ΔM can be found using the following Formula (1) and Formula (2), respectively. Note that in the example shown in FIG. 43, there are three types of magnification rates to which the beam width tuning unit 22 can be switched (that is, the control values M1 through M3). Accordingly, with respect to the change amounts, only the ΔW may be calculated, and the magnification rate may simply be moved from the previous control value M3 to the current control value M2.

$$\Delta W = W2 - W1 \quad (1)$$

$$\Delta M = M2 - M3 \quad (2)$$

Meanwhile, in the case where the wavefront tuning unit is capable of switching, as indicated in the examples shown in FIG. 34 or 35, the change amounts ΔW and ΔM can also be calculated while factoring in a relationship such as that indicated in FIG. 44. The example shown in FIG. 44 illustrates a case where a wavefront tuning amount of the wavefront switching module 120A or 120B can be switched to one of two types (that is, control values W4 and W5). In this case, it is preferable for the beam width tuning unit to have a configuration that continuously changes the beam width, such as the beam width tuning unit 22E illustrated in FIG. 23. In the example shown in FIG. 44, the control values W0 and M0 of the wavefront tuning unit 24 and the beam width tuning unit 22 corresponding to the previous target spectral bandwidth BWt0 are control values W5 and M4, respectively. In addition, the control values W and M of the wavefront tuning unit 24 and the beam width tuning unit 22 corresponding to the current target spectral bandwidth BWt are control values W4 and M5, respectively. In this case, the change amounts ΔW and ΔM can be found using the following Formula (3) and Formula (4), respectively. Note that in the example shown in FIG. 44, the wavefront tuning amount of the wavefront switching module 120A or 120E can be switched to one of two types (that is, control values W4 and W5). Accordingly, with respect to the change amounts, only the ΔM may be calculated, and the wavefront may simply be moved from the previous control value W5 to the current control value W4.

$$\Delta W = W4 - W5 \quad (3)$$

$$\Delta M = M5 - M4 \quad (4)$$

By controlling the wavefront tuning unit 24 and the beam width tuning unit 22 based on the change amounts ΔW and ΔM calculated as described thus far, there is a possibility that the control response can be accelerated. This in turn makes it possible to carry out feedback control that takes into consideration fluctuations caused by thermal loads and the like.

4. Amplifying Apparatus

Next, the amplifying apparatus 50 illustrated in FIG. 1 will be described in detail using the drawings. The amplifying apparatus 50 may be an amplifying apparatus of a variety of types, such as a power oscillator, a power amplifier, a regenerative amplifier, or the like. Furthermore, the amplifying apparatus 50 may be a single amplifying apparatus, or may include a plurality of amplifying apparatuses.

4.1 Power Amplifier Using Excimer Gas as Gain Medium

Figure 45:
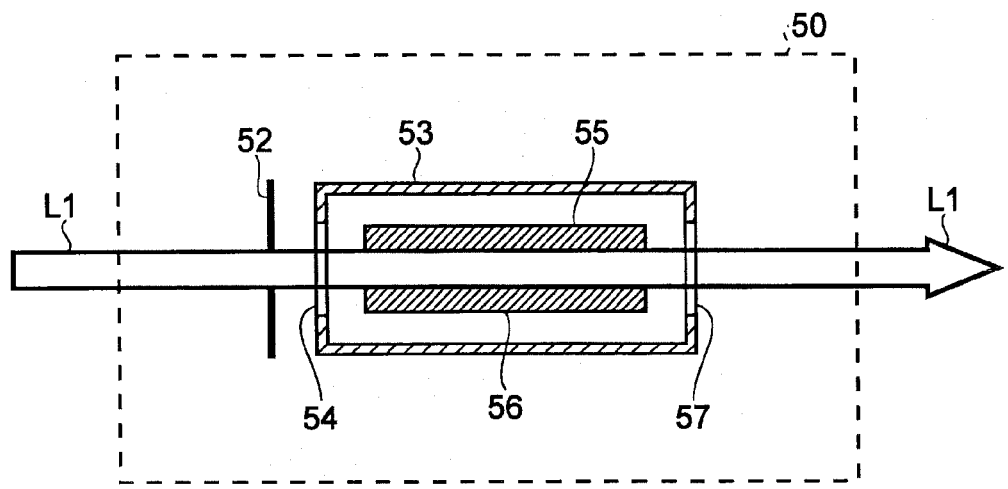
FIG. 45 schematically illustrates the overall configuration of an amplifying apparatus configured as a power amplifier according to an embodiment.

FIG. 45 schematically illustrates the overall configuration of the amplifying apparatus 50 configured as a power amplifier. As shown in FIG. 45, the amplifying apparatus 50 may include a chamber 53. The amplifying apparatus 50 may further include a slit 52 that adjusts the beam profile of the laser beam L1. Windows 54 and 57 may be provided in the chamber 53. The windows 54 and 57 may allow the laser beam L1 to pass through while maintaining the chamber 53 in a sealed state. A gain medium such as an excimer gas may be injected into the chamber 53. Furthermore, a pair of discharge electrodes 55 and 56 may be provided within the chamber 53. The discharge electrodes 55 and 56 may be disposed on either side of a region through which the laser beam L1 passes (an amplification region). A pulsed high voltage may be applied between the discharge electrodes 55 and 56 from a power source (not shown). The high voltage may be applied between the discharge electrodes 55 and 56 in correspondence with the timing at which the laser beam L1 passes through the amplification region. When the high voltage is applied between the discharge electrodes 55 and 56, an amplification region containing an activated gain medium can be formed between the discharge electrodes 55 and 56. The laser beam L1 can be amplified when passing through this amplification region.

4.2 Power Oscillator Using Excimer Gas as Gain Medium

Next, a case where a power oscillator is used as the amplifying apparatus 50 will be described using the following examples.

4.2.1 Embodiment Including Fabry-Perot Resonator

Figure 46:
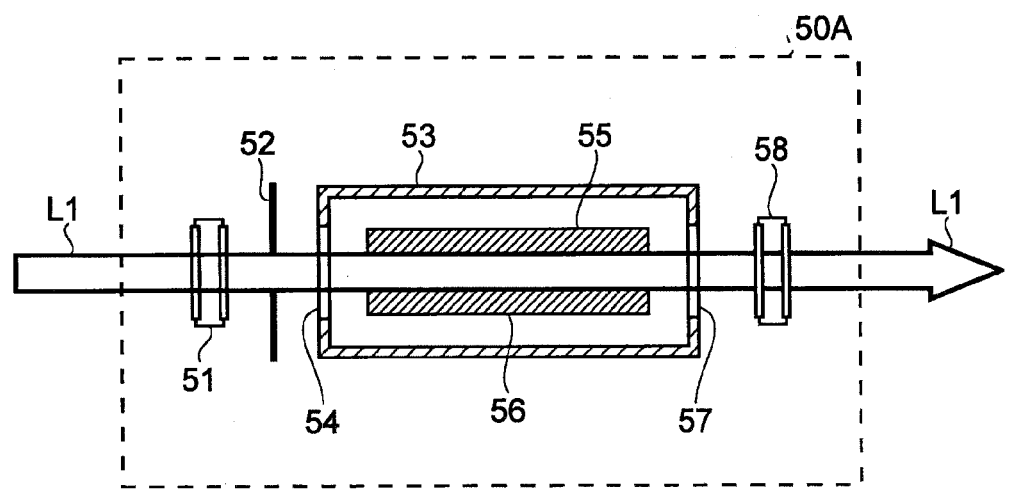
FIG. 46 schematically illustrates the overall configuration of an amplifying apparatus that employs a power oscillator including a Fabry-Perot resonator according to an embodiment.

First, a case where a power oscillator including a Fabry-Perot resonator is used as the amplifying apparatus 50 will be described as an example. FIG. 46 schematically illustrates the overall configuration of an amplifying apparatus 50A that employs a power oscillator including a Fabry-Perot resonator. As shown in FIG. 46, the amplifying apparatus 50A may include, in addition to the same configuration as the amplifying apparatus 50 illustrated in FIG. 45, a rear mirror 51 that reflects some laser beam while allowing some of the laser beam to pass, and an output coupler 58 that reflects some laser beam while allowing some of the laser beam to pass. The rear mirror 51 and the output coupler 58 may form an optical resonator. Here, it is preferable for the reflectance of the rear mirror 51 to be higher than the reflectance of the output coupler 58. The output coupler 58 may serve as an output end for the amplified laser beam L1.

4.2.2 Embodiment Including Ring Resonator

Figure 47:
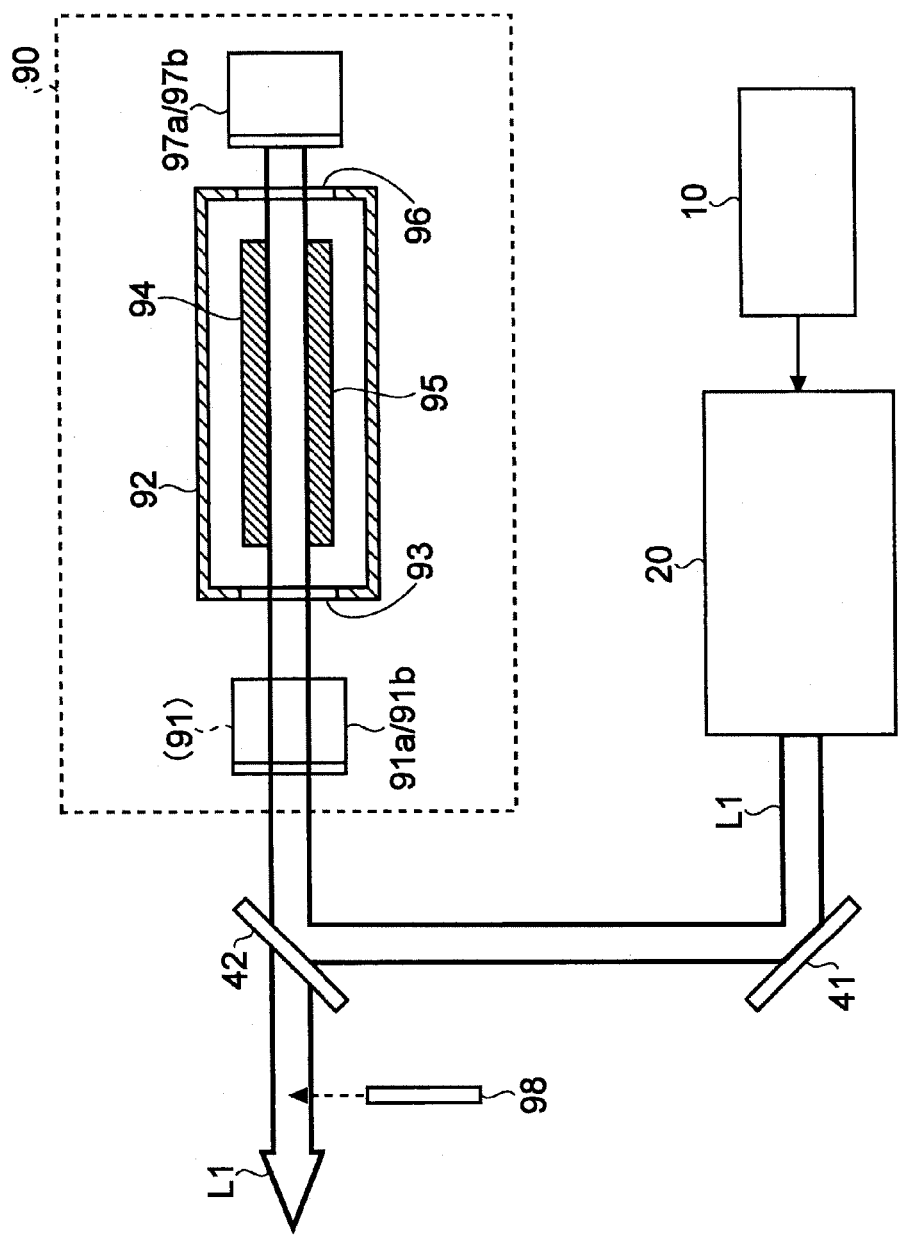
FIG. 47 schematically illustrates the overall configuration of an amplifying apparatus that employs a power oscillator including a ring resonator according to an embodiment.
Figure 48:
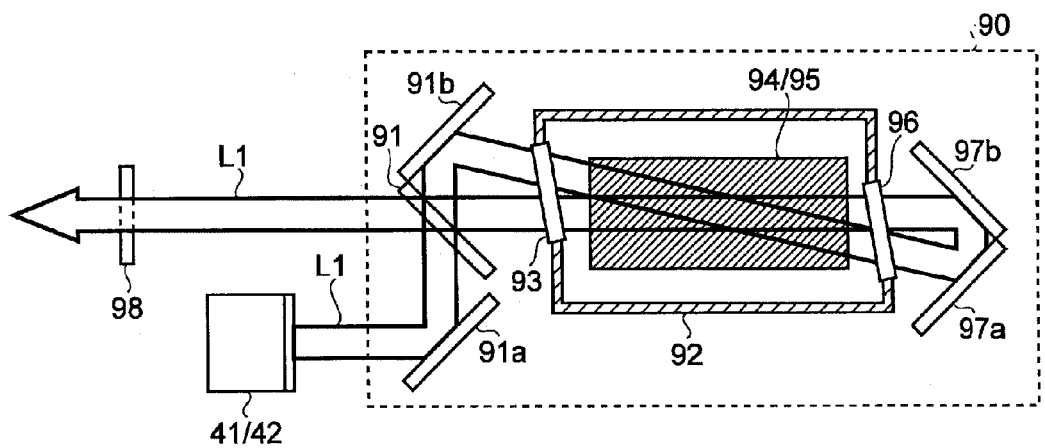
FIG. 48 is a cross-sectional view of the configuration shown in FIG. 47 rotated by 90° using the optical path of a laser beam as an axis.

Next, a case where a power oscillator including a ring resonator is used as the amplifying apparatus 50 will be described as an example. FIGS. 47 and 48 schematically illustrate the overall configuration of an amplifying apparatus 90 that employs a power oscillator including a ring resonator. FIG. 47 is a side view of the amplifying apparatus 90, whereas FIG. 48 is a top view of the amplifying apparatus 90. A shutter 98 that blocks the laser beam L1 outputted from the amplifying apparatus 90 may further be provided at the output stage of the amplifying apparatus 90.

As shown in FIGS. 47 and 48, the amplifying apparatus 90 may include high-reflecting mirrors 91a, 91b, 97a, and 97b, an output coupler 91, and a chamber 92. The high-reflecting mirrors 91a, 91b, 97a, and 97b and the output coupler 91 may form multipass through which the laser beam L1 passes through the amplification region within the chamber 92 a plurality of times. The output coupler 91 may be a partially-reflecting mirror. The chamber 92 may be disposed in the optical path formed by the high-reflecting mirrors 91a, 91b, 97a, and 97b and the output coupler 91. Note that the amplifying apparatus 90 may further include a slit (not shown) that adjusts the beam profile of the laser beam L1 that travels within the amplifying apparatus 90. A gain medium such as an excimer gas may be injected into the chamber 92 so as to fill the amplification region.

In the stated configuration, the laser beam L1 outputted from, for example, the master oscillator system 20 may enter the amplifying apparatus 90 via a high-reflecting mirror 41 and a high-reflecting mirror 42. The laser beam L1 that has entered may first enter the chamber 92 via a window 93 after being reflected by the high-reflecting mirrors 91a and 91b. The laser beam L1 that has entered the chamber 92 may be amplified when passing through an amplification region between two discharge electrodes 94 and 95 between which a voltage has been applied. The amplified laser beam L1 may be emitted from the chamber 92 through a window 96. The emitted laser beam L1 may then once again enter the chamber 92 via the window 96 after being reflected by the high-reflecting mirrors 97a and 97b. After this, the laser beam L1 may once again be amplified when passing through the amplification region within the chamber 92. The amplified laser beam L1 may be emitted from the chamber 92 through the window 93.

The laser beam L1 that has passed through the amplification region within the chamber 92 twice in this manner may then be partially outputted via the output coupler 91. Meanwhile, the remaining laser beam that has been reflected by the output coupler 91 may be amplified by once again traveling through an optical path formed by the high-reflecting mirrors 91b, 97a, and 97b and the output coupler 91.

5. Spectral Detector

Next, the spectral detector 63 illustrated in FIG. 1 will be described.

5.1 Monitor Etalon Spectroscope

Figure 49:
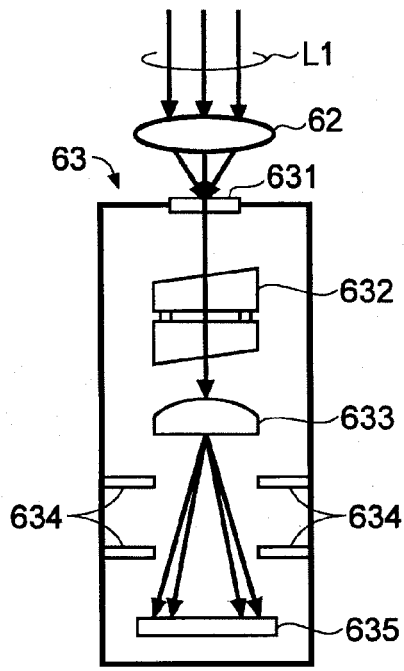
FIG. 49 schematically illustrates the overall configuration of a spectral detector according to an embodiment.

First, the spectral detector 63 using a monitor etalon will be described in detail using the drawings. FIG. 49 schematically illustrates the overall configuration of the spectral detector 63. As shown in FIG. 49, the spectral detector 63 may include a diffuser plate 631, a monitor etalon 632, a focusing lens 633, and an image sensor 635 (this may be a photodiode array instead).

The laser beam L1 that has passed through the focusing lens 62 may first be incident on the diffuser plate 631. The diffuser plate 631 may diffuse the laser beam L1 that has been incident thereon. This diffused light may then be incident on the monitor etalon 632. This monitor etalon 632 may be an air gap etalon in which two mirrors formed by coating the surfaces of substrates through which the laser beam L1 passes with a partially reflective film are affixed to each other with a spacer therebetween so as to form a predetermined gap. The monitor etalon 632 may allow a laser beam at a predetermined wavelength from the incident diffused beam to pass therethrough. This passing beam may be incident on the focusing lens 633. The image sensor 635 may be disposed on the focal surface of the focusing lens 633. The passing beam focused by the focusing lens 633 can produce an interference band on the image sensor 635. The image sensor 635 may capture the interference band that has been produced. The square of the radius of the interference band can be in a proportional relationship with the wavelength of the laser beam L1. Accordingly, the spectrum of the laser beam L1 can be detected from the imaged interference band. The spectral bandwidth, peak intensity, and wavelength of the laser beam L1 may be found based on the detected spectrum using an information processing apparatus (not shown), or may be calculated by the controller 10.

Note that a light-blocking plate 634 may be provided between the focusing lens 633 and the image sensor 635. This makes it possible to reduce stray light and detect the interference band with a high degree of accuracy.

5.2 Grating-Type Spectroscope

Figure 50:
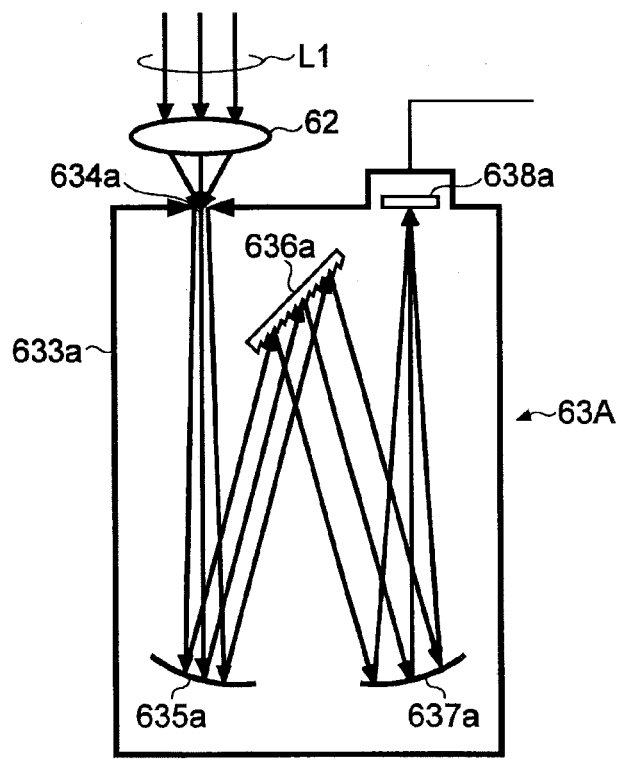
FIG. 50 schematically illustrates the overall configuration of another spectral detector according to an embodiment.

Next, a spectral detector 63A using a grating-type spectroscope will be described in detail using the drawings. FIG. 50 schematically illustrates the overall configuration of the spectral detector 63A. As shown in FIG. 50, the spectral detector 63A may include a diffuser plate (not shown) and a spectroscope 633a. The spectroscope 633a may include a concave mirror 635a, a grating 636a, a concave mirror 637a, and an image sensor (line sensor) 638a.

The laser beam L1 may first be incident on the diffuser plate. The diffuser plate may diffuse the laser beam L1 that has been incident thereon. This diffused beam may be incident on the focusing lens 62. A wall in which a beam entry slit 634a of the spectroscope 633a is provided may be disposed in the vicinity of the focal surface of the focusing lens 62. The beam entry slit 634a may be located slightly upstream from the focal surface of the focusing lens 62. The diffused beam focused by the focusing lens 62 may pass through the beam entry slit 634a and be incident on the concave mirror 635a. The concave mirror 635a may convert the diffused beam that has been incident thereon into a parallel beam and reflect that beam. This reflected beam may then be incident on the grating 636a. The grating 636a may diffract the parallel beam that has been incident thereon. This diffracted beam may be incident on the concave mirror 637a. The concave mirror 637a may reflect the diffracted beam that has been incident thereon so as to focus that beam. The image sensor 638a may be disposed on the focal surface of the concave mirror 637a. In this case, the reflected light focused by the concave mirror 637a can form an image on the image sensor 638a. The image sensor 638a may capture the light intensity distribution at the location where the image is formed. The peak position of the optical intensity in the light intensity distribution can be in a proportional relationship with the wavelength of the laser beam L1. Accordingly, the spectrum of the laser beam L1 can be detected from the captured light intensity distribution. The spectral bandwidth, peak intensity, and wavelength of the laser beam L1 may be found based on the detected spectrum using an information processing apparatus (not shown), or may be calculated by the controller 10.

6. Other

6.1 Definition of Spectral Bandwidth E95

Figure 51:
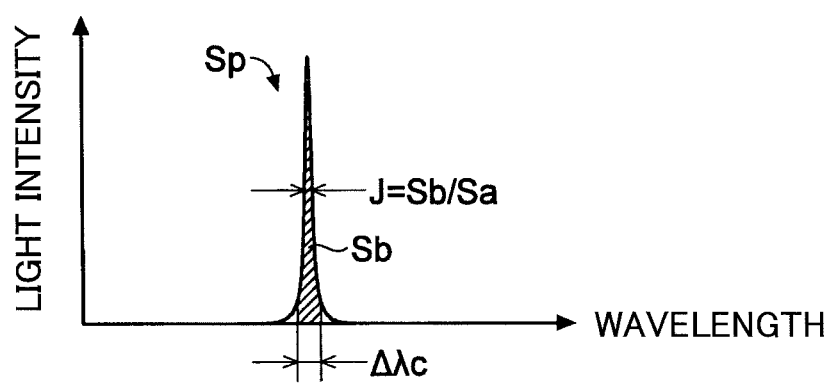
FIG. 51 is a diagram illustrating a spectral purity E95.

Here, the spectral purity E95 will be described using FIG. 51. As shown in FIG. 51, assuming that the light energy of an overall spectrum Sp is Sa and the light energy contained in a bandwidth $\Delta\lambda c$ is Sb, the spectral purity E95 can be defined as the bandwidth $\Delta\lambda c$ at which a spectral purity J expressed by the following Formula (5) is 95%.

$$J = Sb/Sa \quad (5)$$

The aforementioned descriptions are intended to be taken only as examples, and are not to be seen as limiting in any way. Accordingly, it will be clear to those skilled in the art that variations on the embodiments of the present disclosure can be made without departing from the scope of the appended claims.

The terms used in the present specification and in the entirety of the scope of the appended claims are to be interpreted as not being limiting. For example, wording such as "includes" or "is included" should be interpreted as not being limited to the item that is described as being included. Furthermore, "has" should be interpreted as not being limited to the item that is described as being had. Furthermore, the indefinite article "a" or "an" as used in the present specification and the scope of the appended claims should be interpreted as meaning "at least one" or "one or more."

What is claimed is:
1. A master oscillator system comprising:
 a grating configured to function as one resonator mirror in an optical resonator;
 a spectral bandwidth tuning unit configured to tune a spectral bandwidth of a laser beam transmitted within said optical resonator;

a storage unit configured to store a control value of said spectral bandwidth tuning unit corresponding to a desired spectral bandwidth; and a controller configured to control said spectral bandwidth tuning unit based on the control value stored in said storage unit.

2. The master oscillator system according to claim 1, wherein said spectral bandwidth tuning unit includes a wavefront tuning unit configured to tune a wavefront of a laser beam incident on said grating within said optical resonator.

3. The master oscillator system according to claim 2, wherein said wavefront tuning unit includes one or more wavefront tuning units and a movement mechanism configured to selectively insert and remove the one or more wavefront tuning units into and from the optical path of the laser beam transmitted within said optical resonator; and said controller selectively inserts and removes said one or more wavefront tuning units into and from said optical path by controlling said movement mechanism.

4. The master oscillator system according to claim 2, wherein said wavefront tuning unit includes:

a convex cylindrical lens having a curved surface that protrudes in a cylindrical shape;

a concave cylindrical lens having a curved surface that is recessed in a cylindrical shape; and a movement mechanism configured to control a distance between said convex cylindrical lens and said concave cylindrical lens;

wherein said convex cylindrical lens and said concave cylindrical lens are disposed so that said curved surfaces thereof are opposed to each other; and wherein said controller adjusts the distance between said convex cylindrical lens and said concave cylindrical lens by controlling said movement mechanism.

5. The master oscillator system according to claim 1, wherein said spectral bandwidth tuning unit includes a beam width tuning unit configured to tune a beam width of a laser beam incident on said grating within said optical resonator.

6. The master oscillator system according to claim 5, wherein said beam width tuning unit includes one or more beam width tuners and a movement mechanism configured to selectively insert and remove the one or more beam width tuners into and from the optical path of the laser beam transmitted within said optical resonator; and said controller selectively inserts and removes said one or more beam width tuners into and from said optical path by controlling said movement mechanism.

7. The master oscillator system according to claim 6, wherein each beam width tuner includes:

a convex cylindrical lens having a curved surface that protrudes in a cylindrical shape; and a concave cylindrical lens having a curved surface that is recessed in a cylindrical shape, wherein said convex cylindrical lens and said concave cylindrical lens are disposed so that the surfaces on the opposite side as said curved surfaces thereof are opposed to each other.

8. The master oscillator system according to claim 6, wherein each beam width tuner has one or more prisms; and said controller selectively inserts and removes said one or more prisms into and from said optical path by controlling said movement mechanism.

9. The master oscillator system according to claim 1, wherein said spectral bandwidth tuning unit includes:

a wavefront tuning unit configured to tune a wavefront of a laser beam incident on said grating within said optical resonator; and a beam width tuning unit configured to tune a beam width of a laser beam incident on said grating within said optical resonator.

10. The master oscillator system according to claim 1, further comprising:

an amplifying unit configured to amplify a laser beam transmitted within said optical resonator.

11. The master oscillator system according to claim 1, wherein said controller receives a target spectral bandwidth serving as a target from an external device and controls said spectral bandwidth tuning unit so that the target spectral bandwidth is obtained.

12. The master oscillator system according to claim 11, wherein upon receiving a change for said target spectral bandwidth from said external device, said controller calculates a difference between a control value for a previous target spectral bandwidth and a control value for a current target spectral bandwidth, and controls said spectral bandwidth tuning unit based on the difference.

13. A laser apparatus comprising:

the master oscillator system according to claim 1; and a detection unit configured to detect a spectral bandwidth of a laser beam outputted from said master oscillator system, wherein said controller controls said spectral bandwidth tuning unit based on the spectral bandwidth detected by said detection unit.

14. The laser apparatus according to claim 13, further comprising:

an amplifying apparatus disposed in an optical path between said master oscillator system and said detection unit and configured to amplify a laser beam outputted from said master oscillator system; and a shutter mechanism provided in an output section of said amplifying apparatus and configured to be able to be opened and closed by a signal from said controller, wherein said controller receives a target spectral bandwidth serving as a target from an external device and controls said spectral bandwidth tuning unit with said shutter mechanism in a closed state so that the target spectral bandwidth is obtained; and said controller controls said spectral bandwidth tuning unit with said shutter mechanism in an open state based on the spectral bandwidth detected by said detection unit.

* * * * *